United States Patent [19]
Glasser et al.

[11] Patent Number: 5,430,142
[45] Date of Patent: Jul. 4, 1995

[54] THERMOPLASTIC PENTOSAN-RICH POLYSACCHARIDES FROM BIOMASS

[75] Inventors: Wolfgang G. Glasser; Rajesh K. Jain, both of Blacksburg, Va.; Markku A. Sjostedt, Rajamäki, Finland

[73] Assignee: The Center for Innovative Technology, Herndon, Va.

[21] Appl. No.: 102,938

[22] Filed: Aug. 6, 1993

[51] Int. Cl.⁶ ............................................. C07H 13/02
[52] U.S. Cl. ................................... 536/115; 536/119; 536/120
[58] Field of Search ......................... 536/115, 119, 120

[56] References Cited

U.S. PATENT DOCUMENTS 4,959,465  9/1990  Klemann et al. ................... 536/115
4,965,353 10/1990  della Valle et al. ................ 536/55.1

FOREIGN PATENT DOCUMENTS 0408501  1/1991  European Pat. Off. .
0408502  1/1991  European Pat. Off. .

*Primary Examiner*—Douglas W. Robinson
*Assistant Examiner*—Kathleen Kahler Fonda
*Attorney, Agent, or Firm*—Whitham, Curtis, Whitham & McGinn

[57] ABSTRACT

A process for chemically modifying substantially pure xylose-rich oligosaccharides and polysaccharides in homogenous phase solution. The process may be advantageously utilized to produce biodegradable, thermoplastic, melt flowable, low shear resistant and low viscosity xylan derivatives.

14 Claims, 14 Drawing Sheets

THERMOPLASTIC PENTOSAN-RICH POLYSACCHARIDES FROM BIOMASS

STATEMENT OF RELATED APPLICATIONS

This application is directed to technology related to the disclosures contained in U.S. patent application Ser. No. 07/700,208, filed Nov. 14, 1991, which is a continuation-in-part of U.S. patent application Ser. No. 07/526,597, filed May 22, 1990. The disclosure of each of these applications is hereby incorporated herein by reference.

FIELD OF THE INVENTION

The present invention relates to a process for preparing thermoplastic pentosan-rich polysaccharides. More particularly, the process relates to the chemical modification of oligosaccharides and polysaccharides, rich in pentoses such as xylose, to produce xylan ethers and esters, wherein the chemical modification may take place as an integral part of the procedure utilized in isolating the oligosaccharide or polysaccharide. Optionally, the process of the present invention may be utilized to produce xylan ester and xylan ether derivatives utilizing isolated xylan as a starting material.

The process of the present invention may be advantageously utilized to produce melt-flowable thermoplastic xylan derivatives suitable for use in applications including biodegradable and/or environmentally degradable plastics, water soluble films and coatings, capsules and tablets, and paper coating. Ethers, esters and mixed ester/alkoxy alkyl ethers with a wide range of different thermal (i.e. thermoplastic) and melt flow characteristics are disclosed herein.

BACKGROUND OF THE INVENTION

The term "biomass" generally describes a collection or mass of organic material or residue of organic material. Sources of biomass include wood chips or sawdust, straw, sugar cane bagasse, corn stalks, barley husks and other harvesting and agricultural residues.

Xylose-rich oligosaccharide, also termed xylans or pentosans became of their prevalent pentose content, can be isolated from various biomass resources by extraction with water and aqueous alkali. The release of xylans from biomass may be assisted by any one of many optional pre-treatment procedures, such as steam explosion, organosolv pulping, mild hydrolysis, etc. Many procedures for isolating xylans from biomass have been described, including the technique described in our co-pending patent application referenced above. Xylose-rich oligosaccharides and polysaccharides are also generally available commercially from such sources as Sigma Chemical Company, St. Louis, Mo.

Xylan serves structural biomass components, such as wood, straw, fruit hulls, and nuts, etc., as a biodegradable interfacial compatibilizer which assists in the stress transfer of the reinforcing cellulose fibers to the continuous lignin-rich matrix. Xylans are the constituents of biomass that degrade most rapidly when biomass rots in the natural environment. It is generally believed that xylan is capable of performing these functions by combining the chemical structural features of cellulose (the reinforcing fiber component) with the morphological structural features of lignin (the continuous amorphous network). At the same time xylan retains the biodegradability characteristics of such non-crystalline polysaccharides as starch, and it is biodegradable and/or environmentally degradable even after extensive chemical modification, such as by branching and acetylation, has taken place.

Several xylan derivatives have been described and may be generally known to those of ordinary skill in the art. The term "xylan derivative" refers to a xylan that has been modified to alter its chemical or molecular structure. None of the heretofore described xylan derivatives have been produced utilizing a procedure that allows the thermal responses of the xylan derivative, such as glass to rubber transition and melting point, to be selectively tailored in relation to the type and extent of modification. This is the subject of the current disclosure.

Whereas "thermoplastic" derivatives of cellulose and starch are known, similar thermoplastic derivatives have not been described for xylan. The term "thermoplastic" as utilized herein refers to a high polymer that softens when exposed to heat, and becomes deformable in this condition, and returns to its original condition when cooled to room temperature. Thus, "thermoplastic xylan derivatives" are xylan derivatives which exhibit this behavior.

It is generally known that xylans have significantly different solubility characteristics than cellulose or starch, and different chemical and molecular structures than cellulose or starch. Due to xylans' significantly different solubility characteristics, i.e., solubility in aqueous alkali but insolubility in virtually all organic solvents; and due to xylans' different chemical and molecular structure, i.e., branched, amorphous, composed of several different types of monosaccharides (heteropolysaccharides), and consisting of different types of functional groups (i.e., OH groups, acetoxy groups, carboxy groups, methyl ether groups, etc.) xylans represent a different type of polysaccharide that behaves differently during modification than cellulose and/or starch derivatives.

It would be advantageous to produce xylan derivatives with known properties in relation to important thermal responses such as softening and melting.

It would also be advantageous to produce a melt flowable biodegradable and/or environmentally degradable xylan derivative with the ability to interact with other natural and melt flowable materials on account of being chemically and molecularly compatible with other polymeric components.

It would be further advantageous to be able to isolate thermoplastic xylan derivatives in substantially pure form from the mixtures of components found in aqueous extracts of biomass or aqueous solutions of oligosaccharides and polysaccharides.

SUMMARY OF THE INVENTION

We have discovered processes and methods for the modification of xylose-rich oligosaccharide and polysaccharides (xylans) in homogenous phase to produce xylan derivatives. The xylan derivatives produced by the process of the present invention may be derived from xylans from any biomass, or commercial source. Preferably, the xylan derivatives are produced from an aqueous extract of biomass by a stepwise procedure involving the treatment or the biomass to separate the "pentosan-rich" polysaccharides, the modification of the "pentosan-rich" polysaccharide to produce the xylan derivative, and then the isolation and purification of the xylan derivative. As used herein the term "pentosan-rich" polysaccharide refers to a polysaccharide having a pentosan content of at least 20% to about 30%, by weight, and a xylose content of at least 20%, by weight; preferably a pentosan content of 40 to 80%, by weight, and a xylose content of 40 to 75%, by weight.

The xylan derivatives produced by the process of the present invention have potential for use in pharmaceutical, agriculture, food and feed, polymer, and separations applications. More particularly, the xylan derivatives isolated by the process of the present invention have significant potential for use in numerous applications. They may be utilized in plastics, especially biodegradable and/or environmentally degradable plastics, resins, films and coatings in the food industry. They also have potential for use in pharmaceuticals, polymeric segments for bio-degradable plastics, and in separation technology.

The preferred xylan derivative product of the process of the present invention also has significant potential for use in numerous applications and with appropriate chemical modification, such as acetylation, are particularly advantageous for reducing shear-resistance of common thermoplastic materials, such as polystyrene, during melt processing.

In general, the process of the present invention involves dissolving xylan in aqueous alkali, or organic solvents, to produce homogenous solutions in which the xylan polymer is fully dissolved. Such solutions are difficult to achieve with other polysaccharides. Depending on the type of the desired modification, reactions may be performed in aqueous alkaline solution, or in solutions of formamide at different concentrations. Preferably, reactions with alkyl halides, oxiranes (i.e., epoxy group carrying substances), etc. are performed in aqueous alkaline solutions. Such reactions are preferably carried out prior to the final isolation step of xylan, as part of the xylan isolation protocol, while xylan is present in aqueous alkaline solution prior to ultrafiltration. Alternatively, the reaction may be performed in solutions prepared by dissolving isolated xylan in powder form in aqueous alkali. Following reaction in aqueous alkali, xylan derivatives may be separated by either precipitation from an appropriate non-solvent, or by ultrafiltration, followed by spray- or freeze-drying.

In a preferred embodiment, the xylan derivative is produced from an aqueous extract of biomass by a stepwise procedure wherein the biomass extract is first treated to separate the xylan-rich polysaccharide component, which is then purified, preferably through the use of aqueous alkali, to produce a substantially homogeneous solution of xylan-rich polysaccharide. The xylan-rich polysaccharide is then chemically modified, in solution, by the process of the present invention. The resultant xylan derivative components are then purified and isolated, preferably by ultrafiltration to recover the xylan derivatives. A procedure for the isolation of polysaccharides from aqueous solutions of biomass, without the chemical modification step of the process of the present invention, is described in detail in our co-pending U.S. patent application Ser. No. 07/700,208, the disclosure of which is hereby incorporated by reference.

Reactions of the xylan in homogeneous phase, utilizing solutions of formamide as a solvent, are useful for those reactions which require non-aqueous conditions, especially esterifications. These reactions may also involve reactions with acid anhydrides or acyl chlorides. Preferably, isolation of the xylan derivative is achieved, after these types of reactions, by precipitation in an appropriate non-solvent.

Reactions in homogeneous phase are desirable for the purpose of achieving uniform distribution of substituents along the backbone of the polysaccharide. Non-uniform distribution could produce materials with blocky character, in which part of the polysaccharide backbone behaves differently in terms of thermal responses and solubility, than the rest of the backbone.

The process of the present invention advantageously produces a derivative product with targeted and modified thermal properties, compatibility with other polymers, and biodegradability. The process of the present invention also allows the production of polysaccharide materials with unique properties such as melt flowability with low shear resistance on account of branching, and with biodegradability.

Another advantage of the process of the present invention is that the process results in the efficient reaction of xylan, in homogenous phase solution, due to xylans' particular solubility characteristics.

A further advantage is that the process provides an efficient process for modifying the xylan in aqueous alkali as pan of the isolation protocol, prior to purification and isolation by ultrafiltration.

A still further advantage of the present invention is that the degree of substitution of the xylan derivative, resulting from the reaction in aqueous alkali, may be adjusted by adjusting either, or both, the pH and the reagent concentration.

An advantage of the xylan derivatives produced by the process of the present invention is that the xylan derivatives may be utilized in plastics, especially biodegradable and/or environmentally degradable plastics, resins, films and coatings in the food industry.

Another advantage of the xylan derivatives produced by the process of the present invention is that the xylan derivatives may be utilized in pharmaceuticals, polymeric segments for bio-degradable plastics, and in separation technology.

A further advantage of the xylan derivative product of the process of the present invention is that with appropriate chemical modification, such as acetylation, it is particularly advantageous for reducing shear-resistance of common thermoplastic materials, such as polystyrene, during melt processing.

Other details and advantages of the present invention will become apparent in the following and more detailed description.

DETAILED DESCRIPTION OF THE INVENTION

Figure 1:
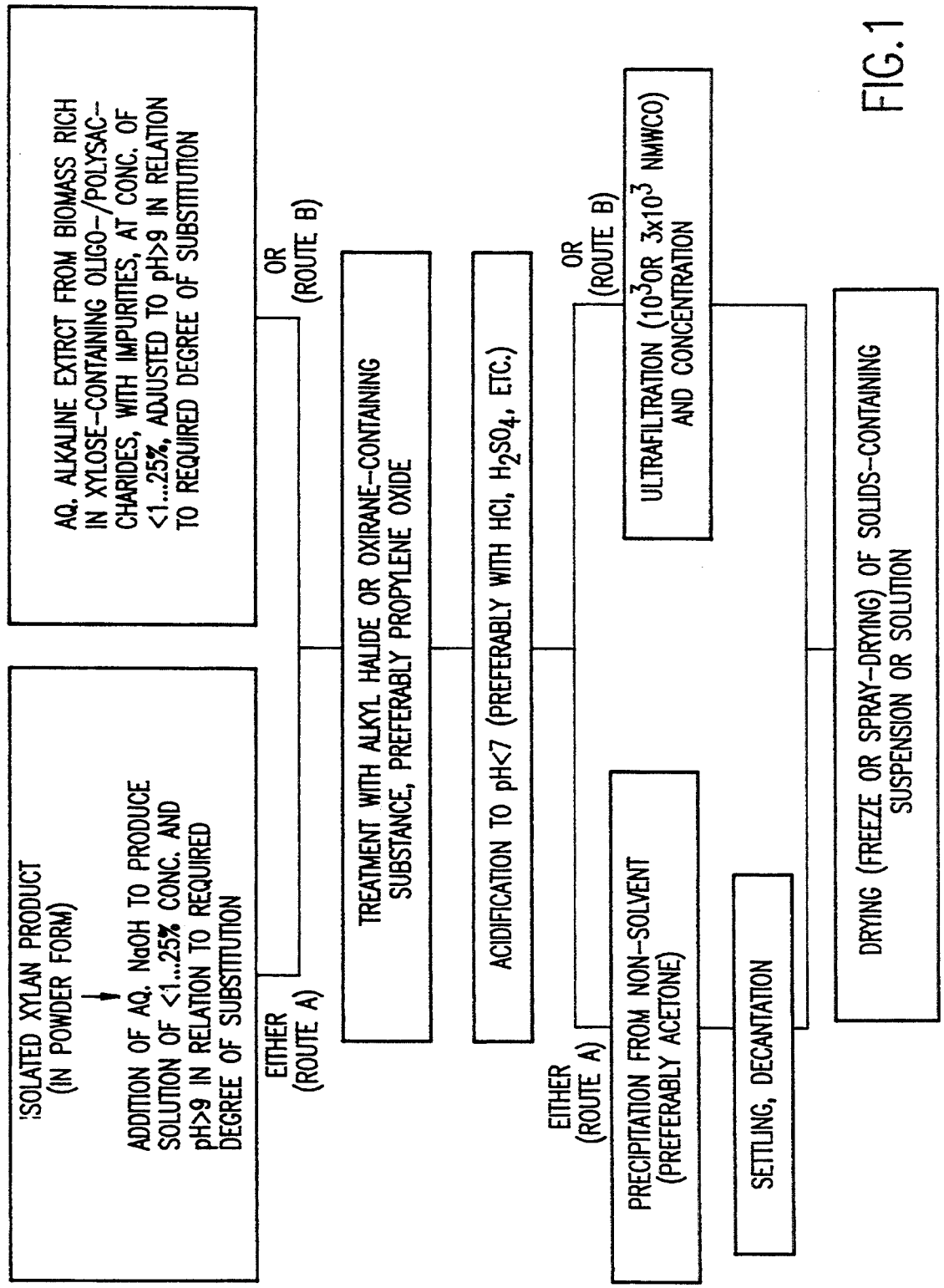
FIG. 1 illustrates the generic xylan modification process for reactions in aqueous alkali. This may involve dissolving isolated xylan in powder form in aqueous alkali (route A), or it may involve alkaline solutions containing xylose-rich oligo- or polysaccharides in addition to other biomass components prior to final purification by ultrafiltration (route B). Both routes, A and B, are appropriate and efficient for producing the final xylan derivative.
Figure 2:
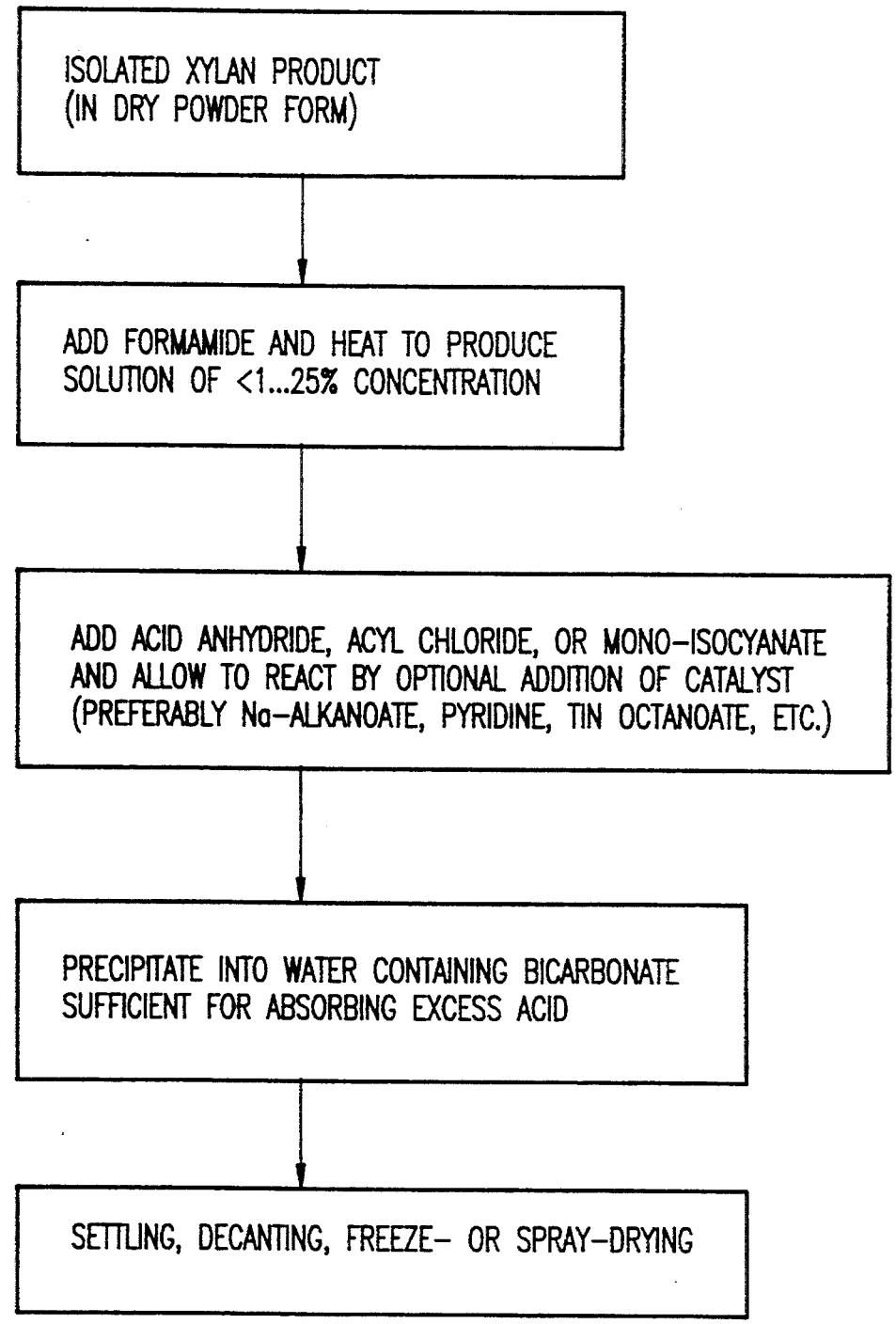
FIG. 2 illustrates a generic xylan modification process for a reaction in non-aqueous medium, in homogenous solutions of formamide.

The present invention provides a novel and advantageous process for chemically modifying xylose-rich oligosaccharide and polysaccharides in homogeneous phase. The derivatives being prepared in homogeneous phase include but are not limited to those of the classes of ethers, especially hydroxyl-alkyl ethers, and esters.

The derivatives may be utilized in a variety of applications. The xylan derivatives produced by the process of the present invention have potential for use in pharmaceutical, agriculture, food and feed, polymer, and separations applications. More particularly, the xylan derivatives isolated by the process of the present invention have significant potential for use in numerous applications. They may be utilized in plastics, especially biodegradable and/or environmentally degradable plastics, resins, films and coatings in the food industry. They also have potential for use in pharmaceuticals, polymeric segments for bio-degradable plastics, and in separation technology.

The products of the present invention may advantageously be biodegradable and/or environmentally degradable. Preferably, the xylan derivatives are recognized by xylanolytic enzymes resulting in biodegradable and/or environmentally degradable polysaccharides. This means that the xylan derivatives of the present invention may be subject to biodegradability under other conditions involving mixed microbial cultures even if the ability for xylanases to recognize xylan derivatives is absent.

The term environmental degradation encompasses all the different degradative processes affecting a polymer disposed in nature. Environmental degradation is caused by physical, chemical and biological factors. The physical factors include: mechanical shear caused by wind, rain, animals etc., stress caused by thermal fluctuations, as well as photochemical effects caused by sunlight. Chemical degradation results, when the polymer reacts with various chemical compounds, notably atmospheric oxygen and water present in the environment. On the other hand, biodegradation, is generally utilized to refer to the process caused by enzymes and/or metabolites produced by micro-organisms.

Biodegradation may be generally defined as the conversion by micro-organisms of a material to carbon dioxide, water and other trace inorganic products under aerobic conditions or to carbon dioxide, methane and other inorganic products under anaerobic conditions. Biodegradation is therefore generally considered a subset of degradation, which is generally defined as any physical or chemical change in a material caused by any environmental factor including light, heat, moisture, wind, chemical conditions or biological activity.

The pentosan-rich polysaccharide (xylan) derivatives produced by the process of the present invention may be characterized by one, or more, of the following characteristics:

- a molecular weight between 1000 and 100,000 daltons;
- an average degree of polymerization of 10–600, preferably 10–300, more preferably 10–250;
- a degree of substitution between 0.2 and 2.0, preferably with uniform distribution of substituents throughout the polymeric backbone; and
- a polydispersity index of 2–20;
- an average pentose content of 20–100%:
- thermal response characteristics (glass transition temperature, $T_g$, and melting point $T_m$) related to the type and degree of substitution; preferably a $T_g$ of 50°–150° C., and interfacial compatibility related to the type and degree of substitution.

Preferably, the xylan derivatives produced by the process of the present invention are biodegradable and/or environmentally degradable, with the biodegradable and/or environmentally degradable characteristics related to the type and degree of substitution.

The properties of the compounds produced by the process of the present invention, molecular weight, average degree of polymerization, degree of substitution, polydispersity index, average pentose content, glass transition temperature, $T_g$, melting point, $T_m$ and interfacial compatibility may be determined in manners generally known to those of ordinary, skill in the art. For example, molecular weight may be determined by gel permeation chromatography or in the manner described in ASTM Test Procedure D3593. Average degree of polymerization may be determined by dividing the molecular weight of the derivative by 132, the molecular weight of an anhydropentose unit. Degree of substitution ("DS") may be determined by NMR Spectroscopy. Polydispersity index may be determined by dividing the weight average molecular weight of the derivative ($M_w$) by the number average molecular weight of the derivative. Average pentose content may be determined by hydrolysis and chromatography. Glass transition temperature, $T_g$, and melting point, $T_m$, may be determined by differential scanning calorimetry (DSC) or dynamic mechanical thermal analysis (DMTA), or by the procedures described in ASTM Test Procedure D3418. Interfacial compatibility may be determined by thermal (DMTA) or optical (i.e. scanning electron microscopy) techniques.

The phrase "related to the type and degree of substitution" refers to the fact that the property will vary depending on the substituent groups appended to the polysaccharide background. Thus, the properties of the final xylan derivative may be altered depending on the desired end use of the xylan derivative.

A preferred product of the process of the present invention is a macromolecular pentosan-rich polysaccharide derivative comprising a xylan-rich oligosaccharide substituted with ester or ether moieties, which may include ester and ether moieties substituted with, carboxylic acids and/or halogenated carboxylic acids. The ester moieties include, but are not limited to: straight and/or branched, substituted and/or non-substituted, alkanoyl groups having 1 to 24, preferably 1 to 20, carbon atoms, including alkanoyl groups selected from the group consisting of acetyl, propionyl, butyryl, hexanoyl, octanoyl, decanoyl, lauroyl, myristyl, palmityl, succinyl, phthalyl, fumaroyl; and mixtures thereof. The ether moieties substitute for hydroxy groups in the preferred product and include, but are not limited to: straight and/or branched, substituted and/or nonsubstituted, alkyl groups having 1 to 6 carbon atoms, including alkyl groups selected from the group consisting of methyl, ethyl, propyl, butyl, isopropyl; and mixtures thereof. Examples of substituted ester moieties and ether moieties include succinic acid, fumaric acid, chloroacetic acid and the like, i.e. the alkyl and alkanoyl moieties may be substituted with carboxyl groups.

According to the process of the present invention, a xylose containing starting material having a xylose content between 40 and 90% which is substantially, or fully, soluble in aqueous alkali of pH greater than approximately 10, and having additional solubility in formamide, is treated with etherifying agents, such as straight and/or branched, substituted and/or non-substituted, alkyl halides or oxiranes, or esterifying agents such as acid anhydrides or acyl halides, preferably acyl chlorides, to produce xylan derivatives with desired target properties. After chemical treatment, the resultant product is subjected to purification and isolation steps, including pH adjustment to near neutral, followed by solvent precipitation and/or ultrafiltration. The final xylan derivative product is obtained by freeze or spray-drying (FIG. 1), or any other drying method known to those skilled in the art.

As used herein, the terms alkyl halide, acyl halide, acid anhydride or oxirane, include compounds in which the alkyl or alkanoyl moiety may be branched, as in isopropyl, or straight, as in propyl, and/or substituted, such as with a carboxyl group or a halogenated carboxyl group, as in chloro acetic acid or succinic acid and the like. The term oxirane includes alkene oxides, which are alkenes, or alkylenes having an oxygen or epoxy group.

Preferably, the treatment protocol for reactions in aqueous alkali involve alkaline extracts of biomass, containing xylan and additional impurities normally removed as pan of the xylan isolation and purification procedure during an ultrafiltration step. This "in line" modification represents a particular aspect of the invention. Alteratively, homogeneous solutions may also be prepared by dissolving powdered xylan in aqueous alkali of the appropriate pH level.

The process may include bleaching the aqueous extract solution with hydrogen peroxide, at a pH between 7 and 11; concentrating the resulting solution using an ultrafiltration process; eliminating salts and low molecular weight components via liquid/liquid extraction of the solution with water using an ultrafiltration process; and recovering the oligosaccharide solids using spray-drying, freeze-drying or non-solvent precipitation. Optionally, the bleached solution may be passed through a cation exchange resin to affect the desalination, or additional ultrafiltration steps can be utilized to fractionate the oligosaccharide into more closely defined molecular weight ranges.

Preferably, the decolorization procedure includes treating the aqueous extract solution with hydrogen peroxide ($H_2O_2$) in an amount, by weight, of from 50 to 100% of the lignin content of the aqueous biomass solution, at conditions wherein the solution has a pH of approximately 7, or higher, in the presence of a chelating agent, preferably sodium ethylene diamine tetracetate (Na-EDTA) but also sodium diethylene triamine pentacetic acid ($Na_5DTPA$) or sodium silicate or other qualified chelating agents, at a temperature of approximately 50° C.

Preferably, before the purification/fractionation step of the present process, the decolorization solution is cooled and the pH of the solution is reduced using a mineral acid such as hydrochloric acid (HCl).

The purification/fractionation procedure preferably includes ultra filtration of the bleached solution. Ultrafiltration is a technology that fractionates mixtures of molecules on the basis of molecular size using membranes with specific-porosities. Molecules that are of a sufficiently small molecular size so as to pass through a particular membrane are carried through the membrane in the "permeate" stream, whereas molecules that are retained by the membrane are isolated in the "retentate" stream, by utilizing membranes of different porosities, it is possible to fractionate a mixture of molecules to narrower distributions while at the same time concentrating the retentate streams. Ultrafiltration is also an efficient desalination technique, as it is used in the process of the present invention. An important stage in the ultrafiltration procedure is the process of diafiltration. Diafiltration is essentially a liquid/liquid extraction of the retentate stream using either fresh water or another buffer. To affect diafiltration of the retentate, the fresh water or other buffer, is added to the retentate stream at the same rate that the permeate stream is being removed from the retentate stream. The objective of diafiltration is to completely wash the retentate stream of any lower molecular weight compounds such as salts or monosaccharides. The membrane used during the diafiltration stage defines the "molecular weight cut-off" of the materials that are removed in the process of diafiltration.

FIG. 1 shows a possible flow diagram for a preferred process of the present invention starting from an aqueous alkaline biomass solution. The aqueous alkaline extract (pH 10 to 13.5) from biomass comprising pentosan-rich polysaccharides and other material at a concentration of 1 to 25% is combined with an alkene oxide at a pH 10 to 13.5 and stirred at ambient temperature (18°–25° C.) for 6 to 48 hours. The pH of the chemically modified alkaline extract is then adjusted to approximately pH 7 with hydrochloric acid, and Na-EDTA added in a quantity of 0.1% (w/v). The mixture is then allowed to stir for one hour. Next, hydrogen peroxide solution (25–50%, w/w) is added in a quantity such that the added mass of hydrogen peroxide is approximately equal to the calculated mass of lignin in the aqueous extract solution and the reaction mixture is allowed to slowly heat to 50° C. The bleached solution is then allowed to cool before adjusting the pH to pH 2 to 7 with 10% HCl solution. The neutralized solution is then concentrated using an ultrafiltration apparatus comprised of 3000 nominal molecular weight cut-off (NMWCO) membrane cartridges (such as those manufactured by the Amicon Division, W. R. Grace and Company, Beverly, Mass.) to approximately one-fifth of the original volume. As will be understood by those of ordinary skill in the art, higher or lower NMWCO membrane cartridges may also be used in the ultrafiltration step, to achieve the concentration desired after ultrafiltration. The concentrate is then diafiltered using a volume of fresh water equal to at least three times, but no more than ten times, the volume of concentrate. During the ultrafiltration stages, the temperature of the process solution is maintained at 30° C. with a suitable temperature control device capable of both heating and refrigeration. At the conclusion of diafiltration, the retentate is further concentrated before freeze- or spray-drying to yield the desired pentosan-rich polysaccharide derivative product. Alternatively, the pentosan-rich polysaccharide derivative may be obtained by non-solvent precipitation, or other suitable techniques.

A preferred process of the present invention utilizes a biomass starting material having oligosaccharide and polysaccharide components that are extractable by aqueous solutions. The biomass starting material is treated to separate the extractable oligosaccharides and polysaccharides from the remainder of the biomass. This treatment may be accomplished by treating the biomass with steam at a pressure between 200 and 400 psig, or with organic solvents, aqueous alkali, or weak acid at lower pressure, in the manner known to those of ordinary skill of the art, to separate the aqueous extractable components from the biomass.

Figure 5:
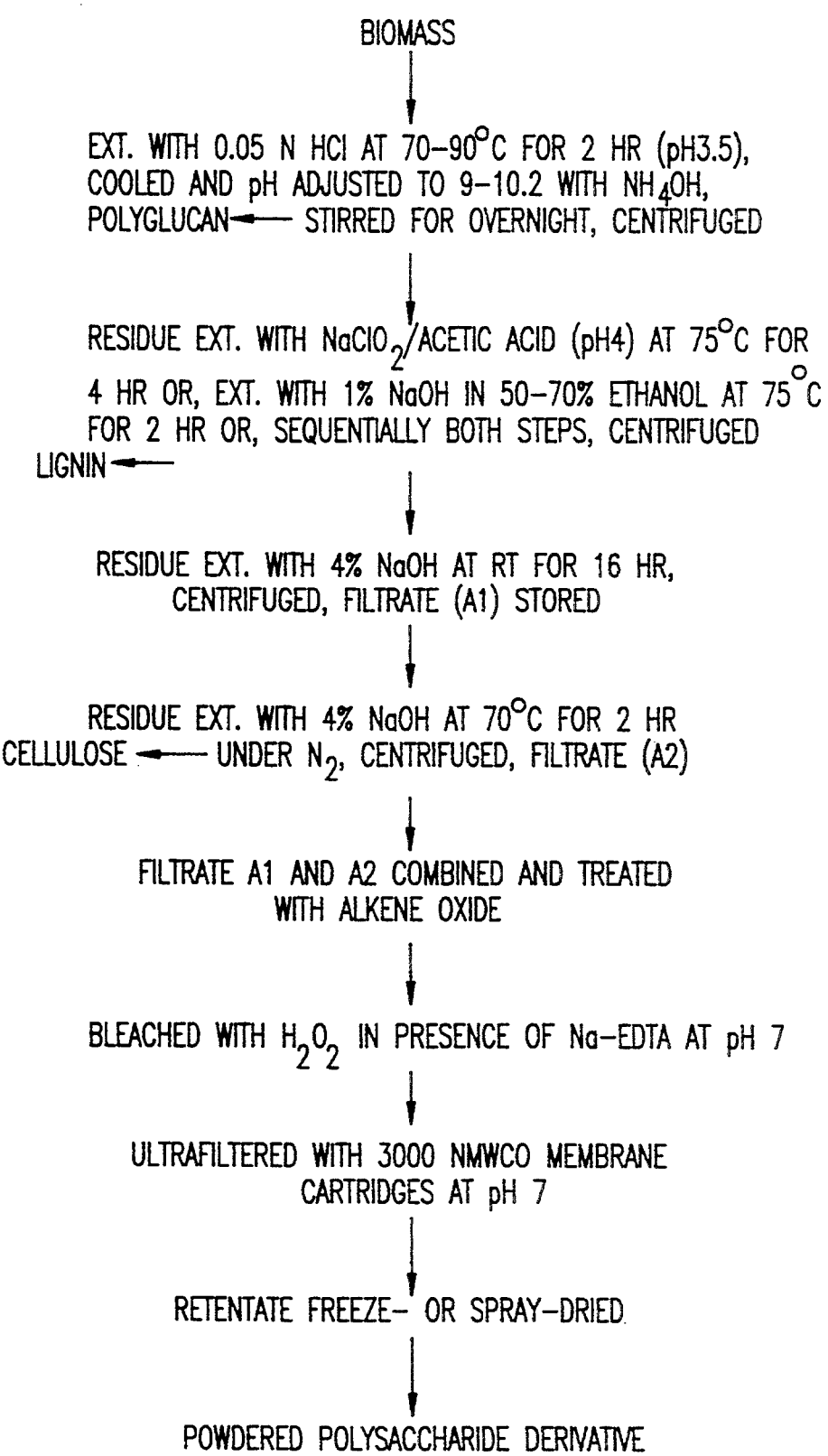
FIG. 5 is a flow diagram of a process for isolating pentosan-rich polysaccharides from an aqueous extract of biomass according to an alternative embodiment of the present invention.
Figure 6:
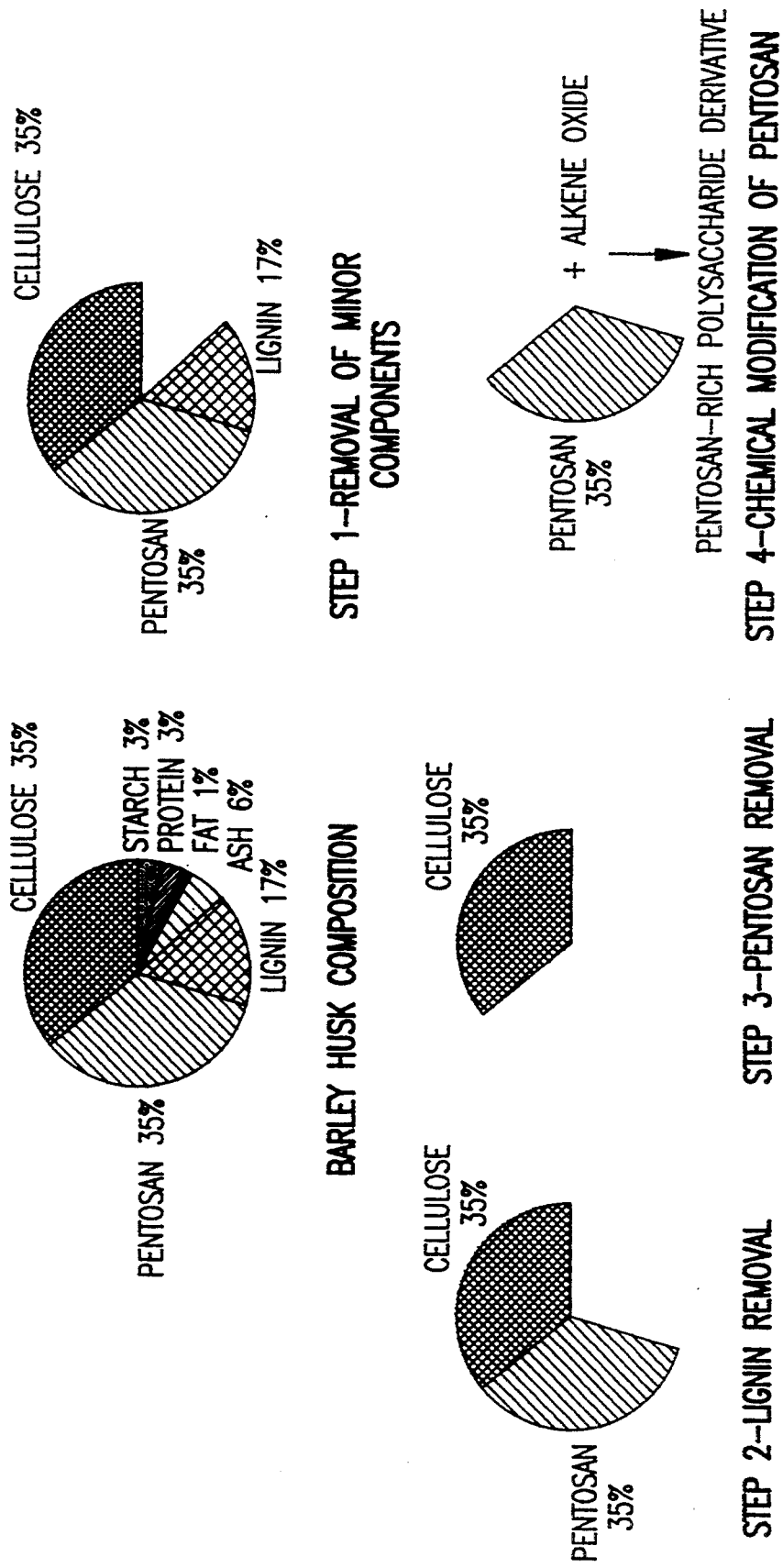
FIG. 6 is a graphical depiction of the separation of individual components from a barley husk biomass composition.
Figure 7:
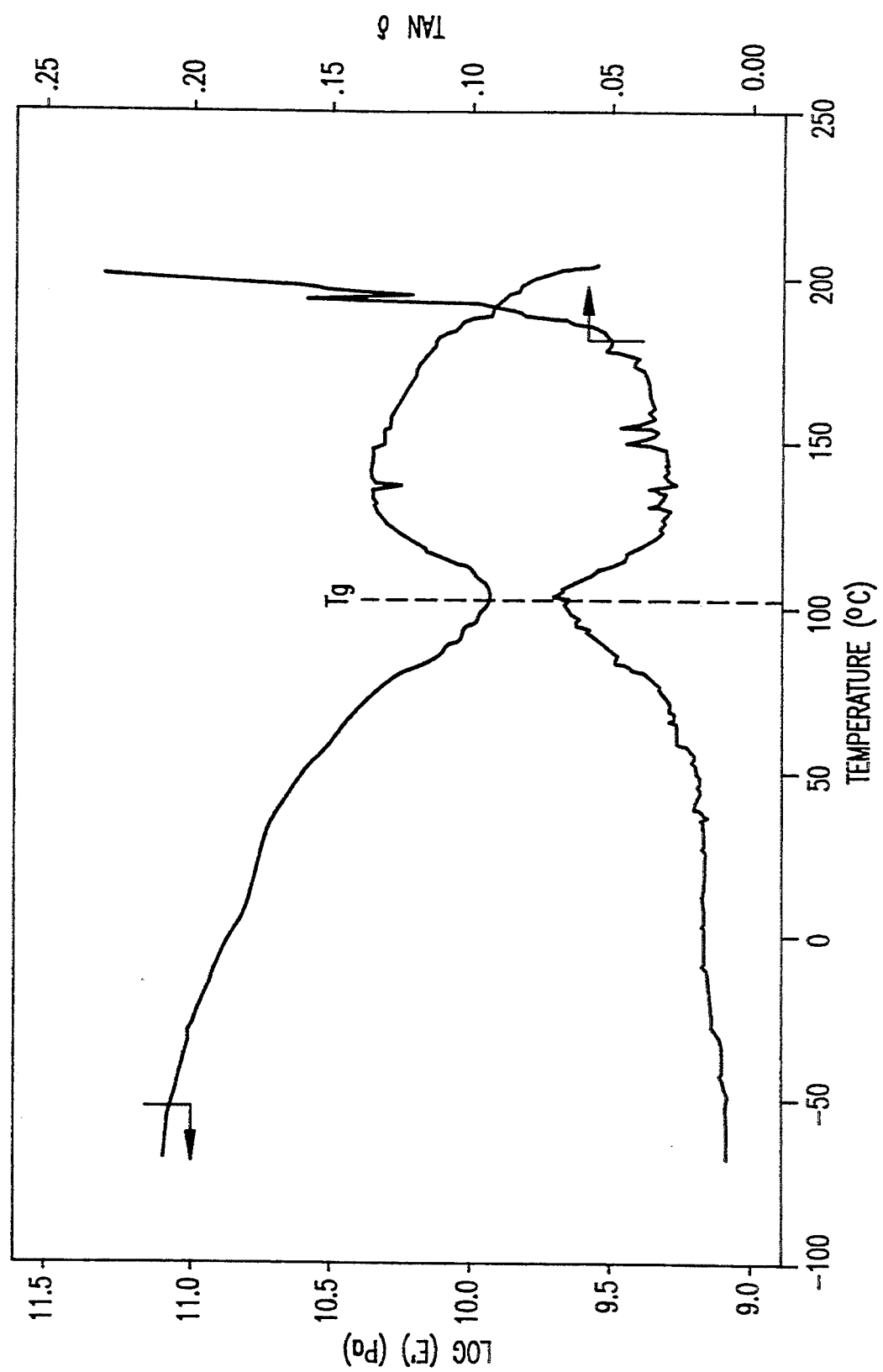
FIG. 7 illustrates a dynamic mechanical thermal analysis thermogram of a solvent cast film of a xylan derivative (hydroxypropyl xylan, degree of substitution (DS)=0.3). The deflections of the tan ∂ curve and the storage modulus curve centered at 100° C. provide conclusive evidence of a glass transition, $T_g$, at this temperature.
Figure 8:
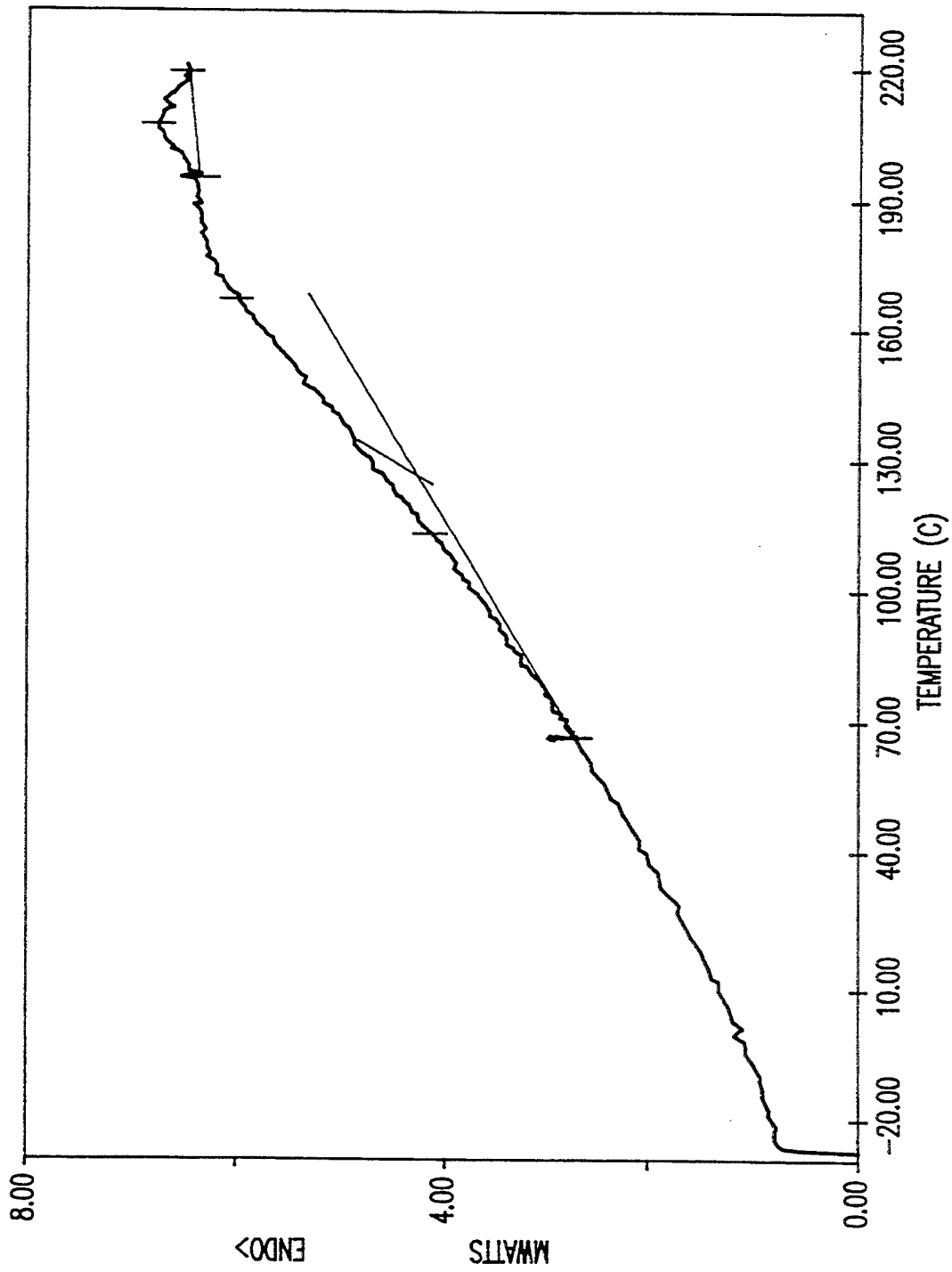
FIG. 8 reflects a differential scanning calorimetry thermogram of a solvent casted xylan derivative (hydroxypropyl xylan, DS=0.5) film, in the third heat after annealing the sample at 160° C. The faint baseline deflection centered around 114° C. and the peak at 207° C. reflect the existence of a glass transition, $T_g$, and melting event, $T_m$, respectively.
Figure 9:
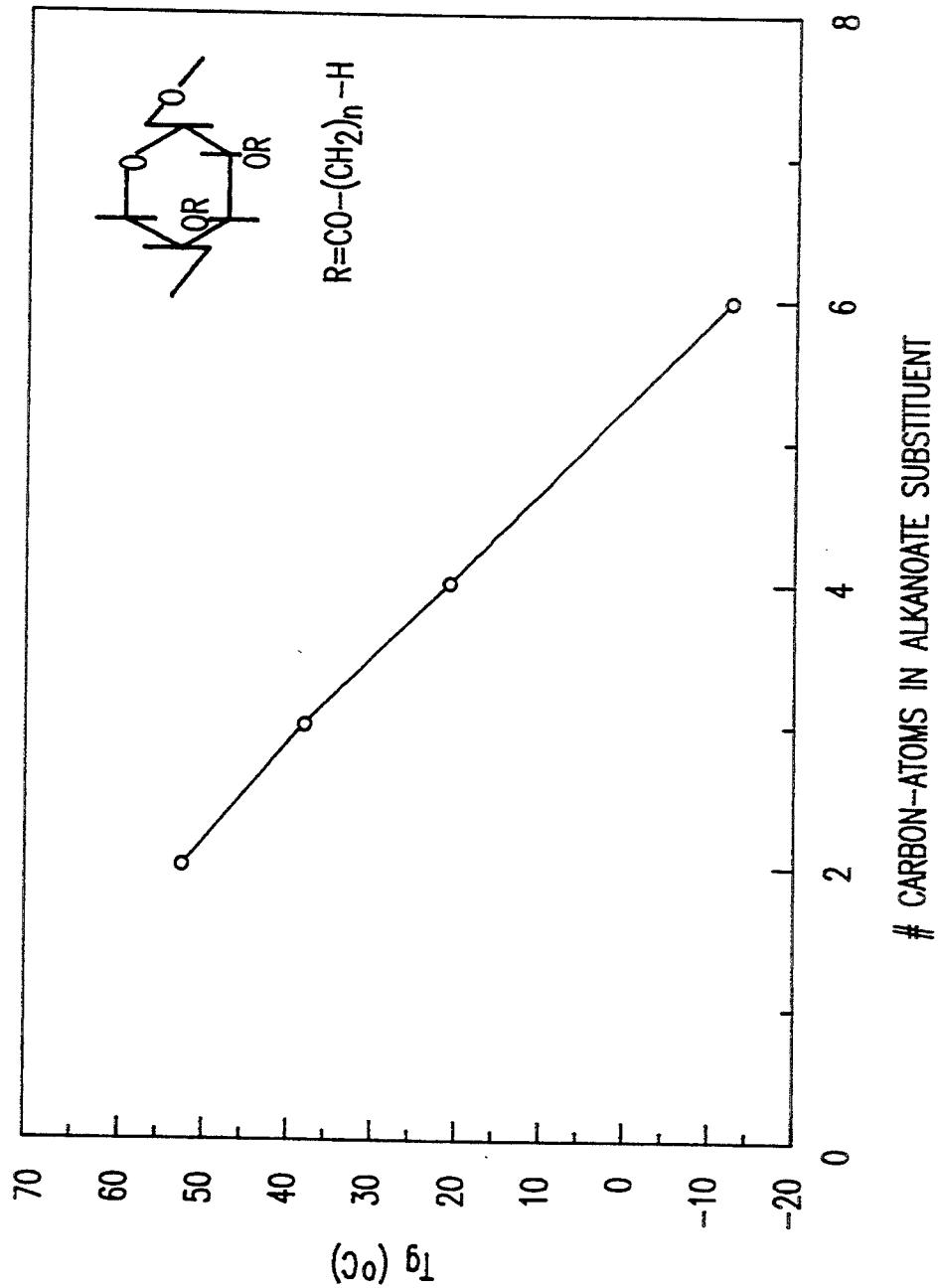
FIG. 9 illustrates the relationship between glass transition temperature, $T_g$, and the number of carbon-atoms in the alkanoate substituents of peracylated xylan derivatives.
Figure 10:
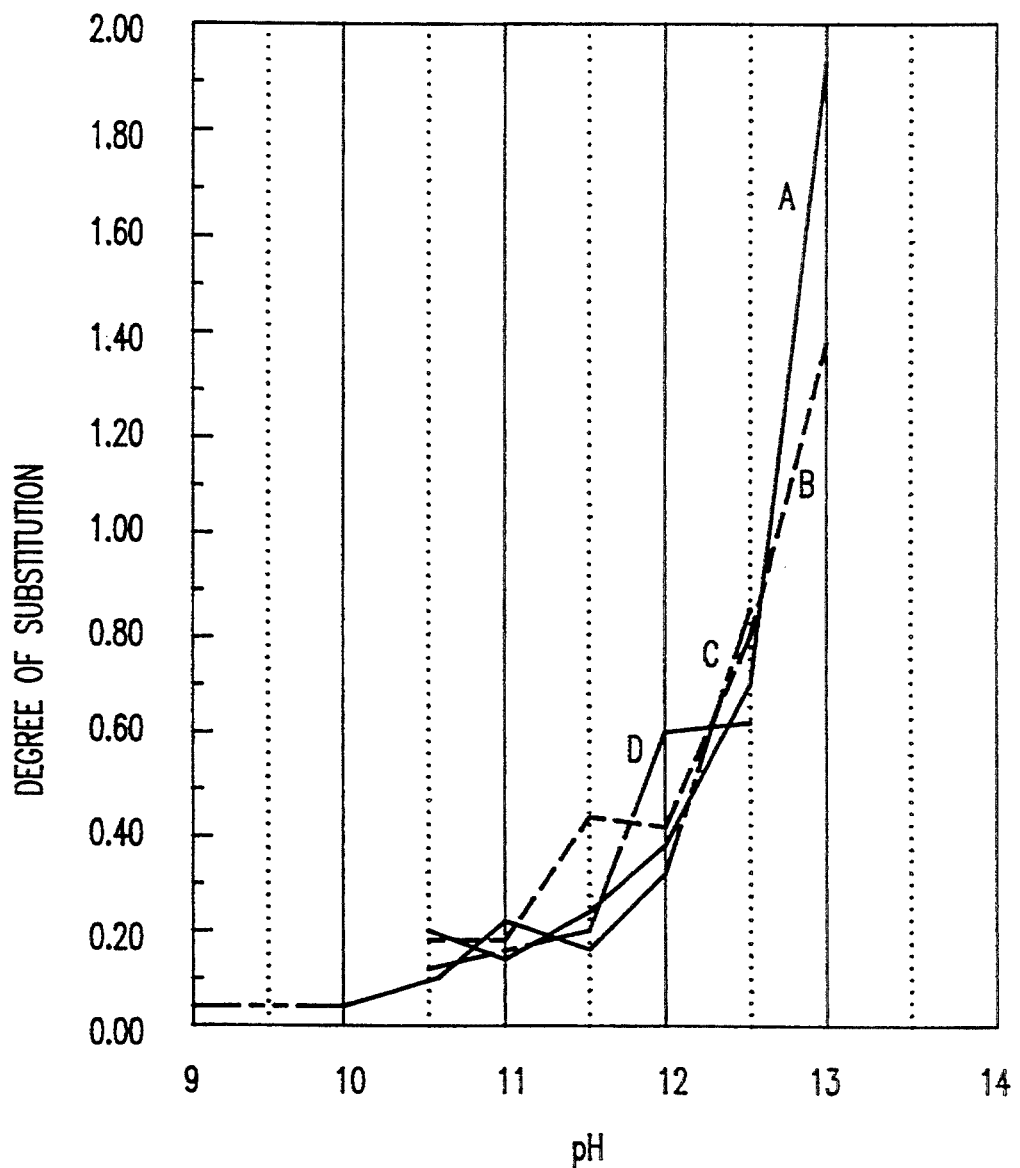
FIG. 10 highlights the relationship between degree of substitution and pH of the homogeneous aqueous alkaline solution of a propoxylation reaction of four different xylan preparations. The data reveal that all different xylan preparations respond to an increase in pH by assuming a higher degree of substitution. This can be explained on the basis of an increased concentration of oxyanions in aqueous alkaline solutions of higher pH.
Figure 11:
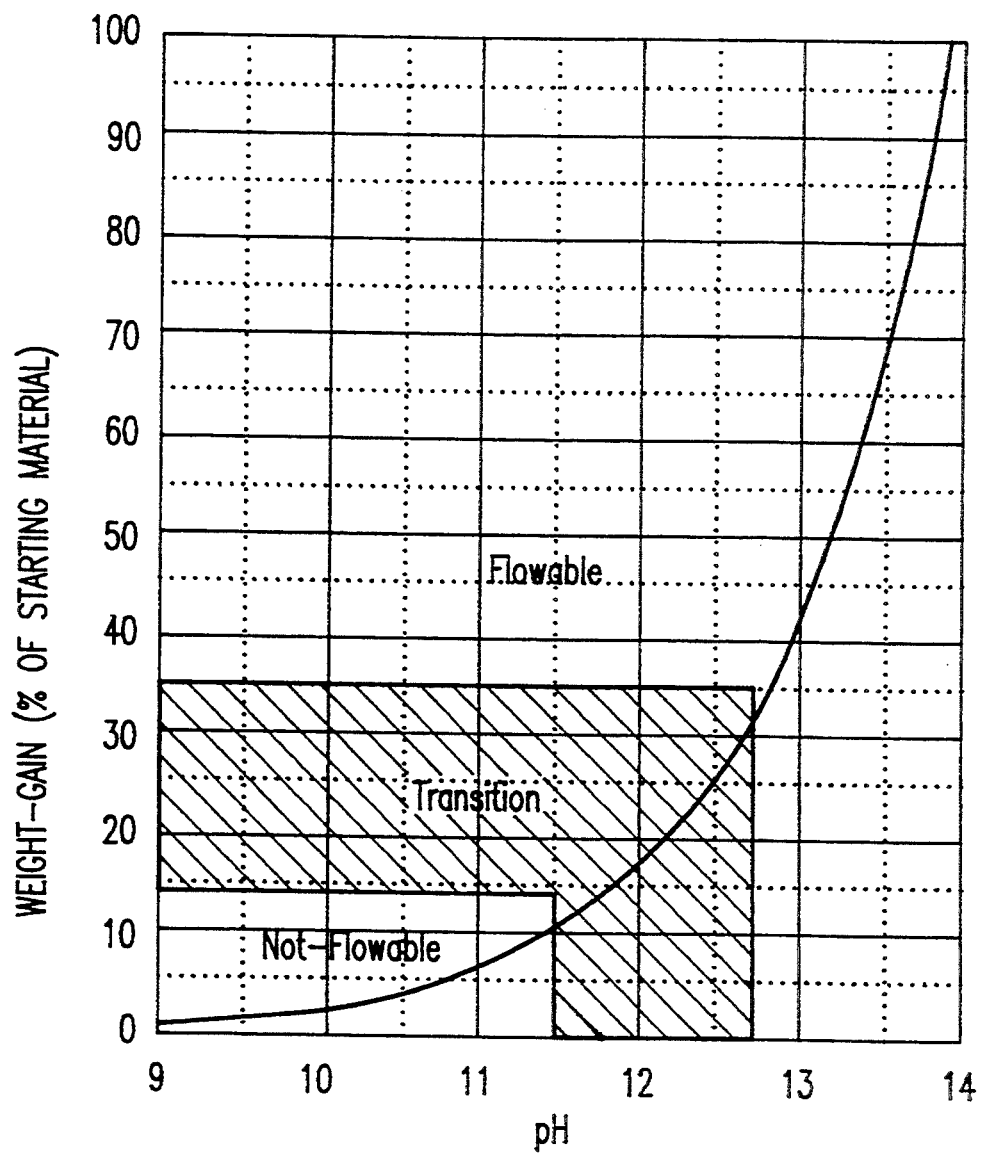
FIG. 11 converts the data of FIG. 10 into weight gain versus pH; and it introduces three distinct regions representing xylan derivatives incapable of thermoplastic flow, derivatives fully capable of undergoing melt flow when mixed with low density polyethylene pellets and compression molded; and a region between flowable and non-flowable derivatives.
Figure 12:
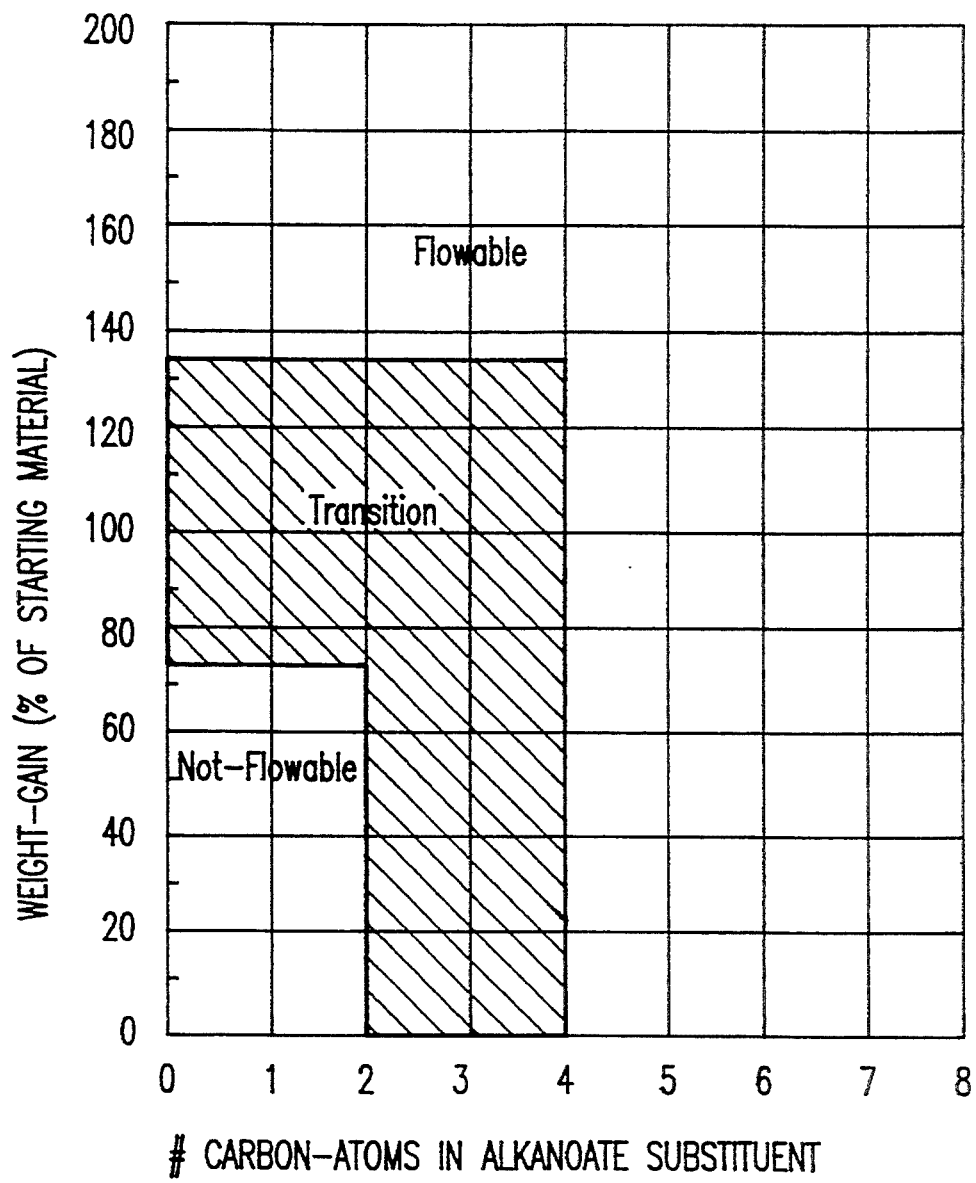
FIG. 12 provides a similar illustration for xylan derivatives with degree of substitution (DS) of nearly two.
Figure 13:
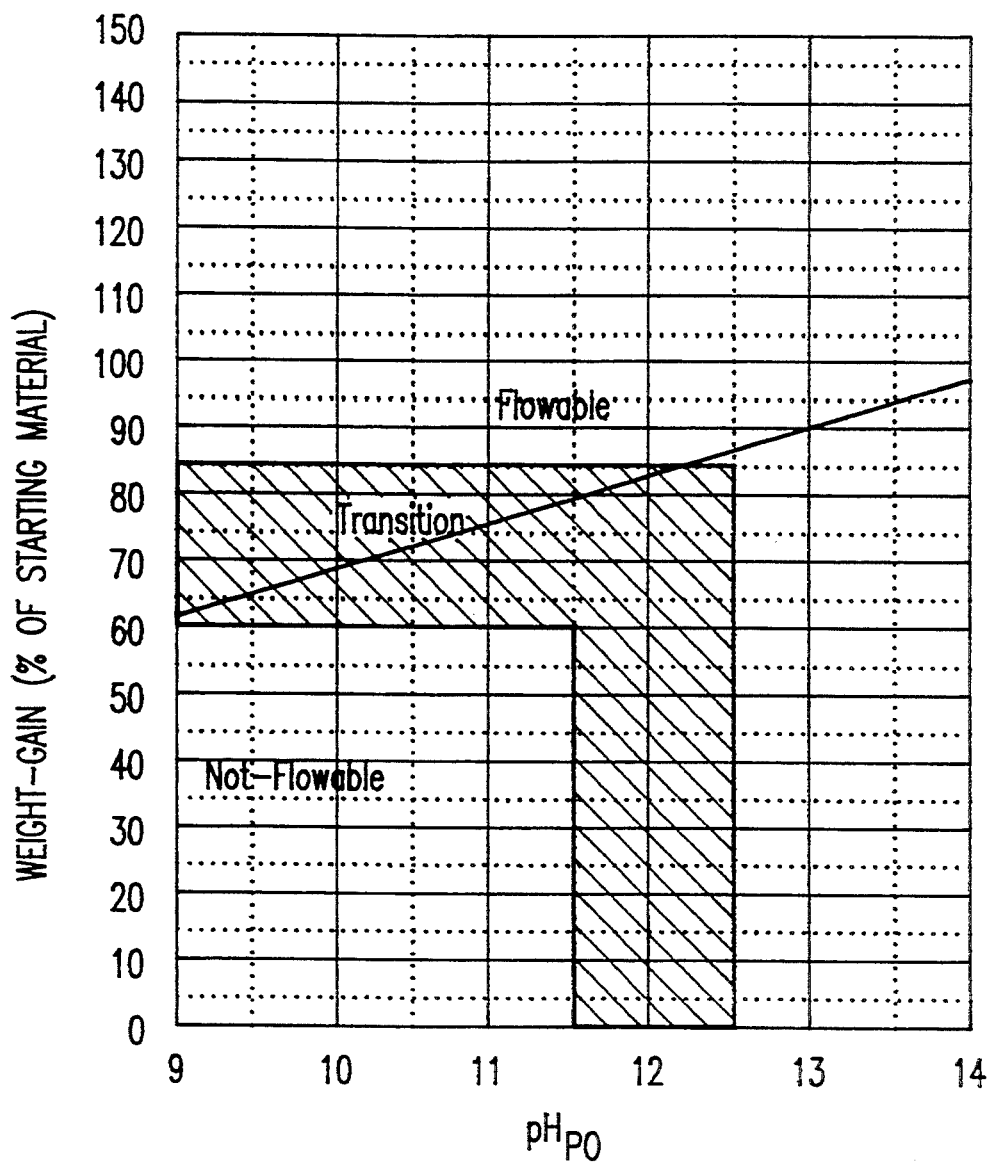
FIG. 13 illustrates the relationship between weight gain and pH of acetoxypropyl xylan derivatives produced by propoxylation in aqueous alkali followed by peracylation in non-aqueous medium.
Figure 14:
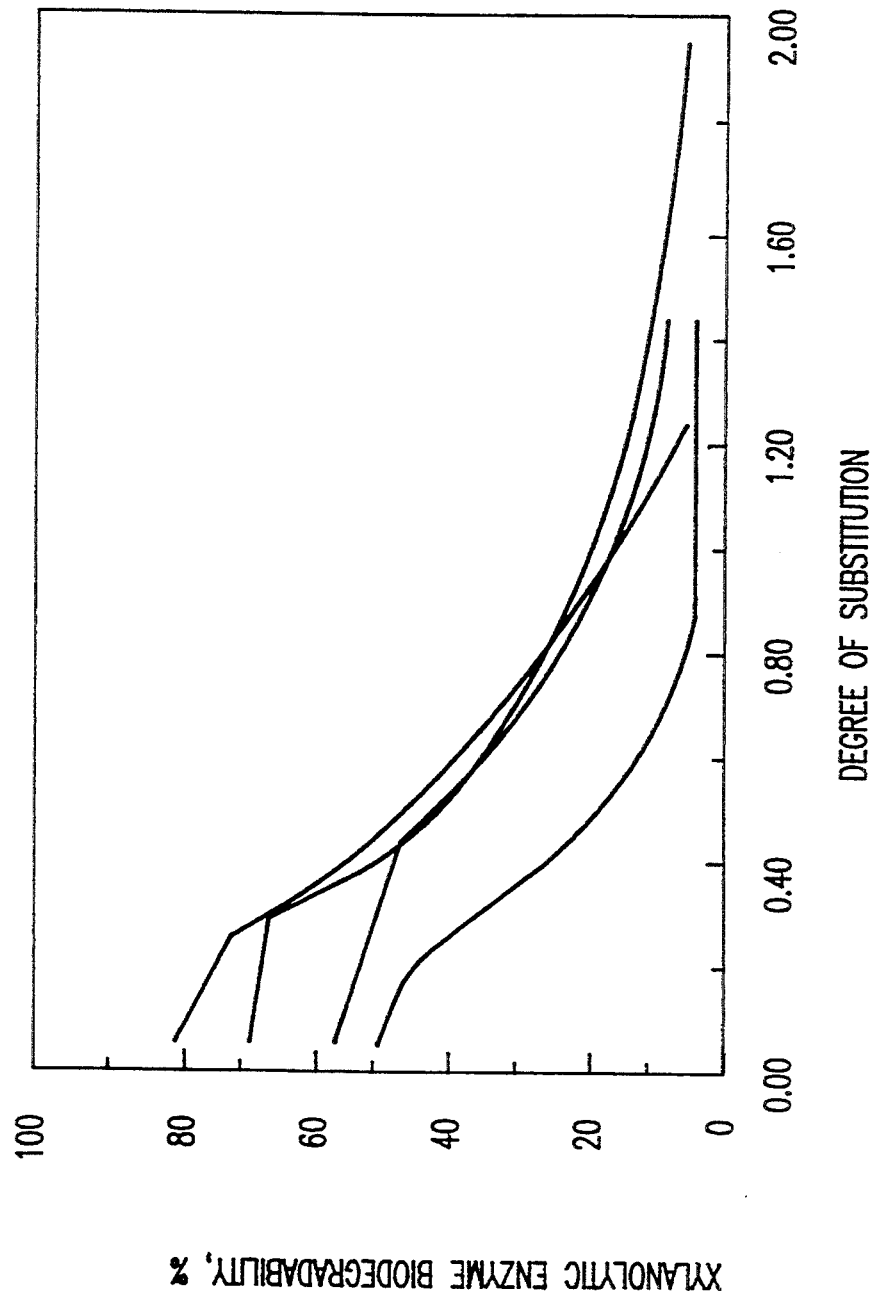
FIG. 14 illustrates the ability of a xylanolytic enzyme to recognize hydroxypropyl xylan derivatives with rising degree of substitution, as (bio)degradable polysaccharide. The recognition of a xylan derivative by a xylan degrading enzyme (xylanase) is a preferred but not necessary, condition of the xylan derivatives of the present invention. This means that the xylan derivatives of the present invention may indeed be subject to biodegradability under other conditions involving mixed microbial cultures even if the ability for xylanases to recognize xylan derivatives is absent. The specifics of the xylan degrading enzyme assay are elaborated upon in the following sections.

Preferably, the treatment protocol involves the stepwise removal of minor and extraneous components from agricultural residue biomass by procedures for isolation of pectic substances after the removal of hemicellulose from the biomass. This type of treatment protocol facilitates the subsequent delignification of the pre-extracted biomass using a process suitable for lignin removal such as organosolv delignification or treatment with chlorite; and by extracting the remaining mixture using aqueous alkali. The stepwise separation of components from barley husk biomass is illustrated in FIGS. 5 and 6. Minor constituents, such as starch, protein, fat and ash are removed by mild acid hydrolysis and ammonia extraction (step 1) before lignin is removed by chlorite treatment or extraction with aqueous ethanolic alkali (step 2). The remaining material consisting of 60 to 80 percent of total biomass is then separated into a cellulose and a pentosan-rich fraction by extraction with aqueous alkali (step 3). This stepwise procedure can be utilized to produce a soluble xylose-rich pentosan in aqueous solution of approximately pH 11 to 13 in yields typically exceeding 20%.

An especially preferred treatment protocol for separating the oligosaccharides and polysaccharide components from a biomass starting material is as follows. The biomass starting material is first combined with a mild acid, generally a 0.01 to 0.1N mineral acid, and heated to a temperature between 50° and 100° C. for about 2 hours. Suitable mineral acids include, but are not limited to: hydrochloric acid and sulfuric acid. The volume ratio of acid to biomass should be sufficient to completely immerse the biomass in the acid and is generally 5–20% (w/v). The mixture is then cooled to ambient temperature, generally 18°–25° C., and treated with a mild alkaline solution at a pH between 8 and 11 for 1 to 16 hours to separate the soluble minor and extraneous components from the insoluble biomass component. Suitable mild alkali solutions include, but are not limited to, ammonium hydroxide, sodium hydroxide and potassium hydroxide. As will be understood by those of ordinary skill in the art the amount of alkali solution utilized is sufficient to rinse the pH of the biomass containing solution to between 8 and 11.

Next the lignin component is removed from the alkali treated residue by organosolv delignification or treatment with chlorite or both. In more detail, the lignin component may be removed by extracting the lignin from the alkali treated residue with sodium chlorite and acetic acid at a pH from 3 to 5, at 60°–80° C. for 1 to 4 hours. The amount of sodium chlorite and acetic acid utilized is sufficient to lower the pH of the biomass containing solution to between 3 and 5. Alternatively, the lignin may be extracted with an alcoholic alkali at a pH from 9 to 12, at 60°–80° C. for 1 to 4 hours. Suitable alcoholic alkali solutions include, but are not limited to: alcoholic sodium hydroxide and alcoholic potassium hydroxide. The amount of alcoholic alkali utilized is sufficient to raise the pH of the biomass containing solution to between 9 and 12. It may also be desirable to perform both the chlorite treatment and the alcoholic alkali treatment on the biomass solution in a sequential fashion. The lignin component may be separated from the extract by acidifying the extract to pH 1.5 to 4.0 using a suitable acid.

After lignin removal the residue is treated with an aqueous alkali solution at a pH from 11 to 13.5, at ambient temperature (20°-25° C.) for 1 to 24 hours. The residue is then treated with an aqueous alkali solution at a pH from 11 to 13.5. at higher temperatures, 50°-80° C. for 1 to 4 hours to separate the extractable polysaccharide components from the cellulose residue. Suitable aqueous alkali solutions include, but are not limited to, sodium hydroxide and potassium hydroxide. The amount of aqueous alkali solution utilized should be sufficient to raise the pH of the biomass containing solution to 11 to 13.5.

To produce pentosan-rich polysaccharide derivatives, the resulting biomass solution is combined with an oxirane (alkene oxide) at a pH of 10 to 13.5 and stirred, generally at ambient temperature (20°-25° C.), for 6 to 48 hours. The reaction mixture is then heated to approximately 5° C. above the boiling point of the respective oxirane; but not higher than 85° C. If 85° C. is below the boiling point of the respective oxirane, an alternative method (i.e. reaction with amines) is utilized to remove the oxirane. The reaction mixture is heated for 1-2 hours and then allowed to cool to ambient temperature. Suitable alkene oxides include, but are not limited to: straight or branched chain alkene oxides having 1 to 6 carbon atoms, including alkene groups selected from the group consisting of ethylene, propylene, butylene, isopropylene, epichlorohydrin and the like. Mixtures of alkene oxides may also be utilized. As will be understood by those of ordinary skill in the art, the final composition of the ether and/or ester moieties of the pentosan-rich polysaccharide derivative produced by the process of the present invention will depend on, and may be selected based on, the alkene oxide utilized in the process.

The foregoing treatment protocol produces a soluble pentosan-rich polysaccharide derivative in aqueous solution of approximately pH 10 to 13.5 in yields typically exceeding 20% of the weight of the polysaccharide in the biomass starting material. The pentosan-rich polysaccharide derivative may be isolated by following process.

According to the present invention the technique for isolating the polysaccharide derivatives includes purification/fractionation from associated components on the basis of molecular parameters such as molecular weight and preferably includes decolorization prior to purification/fractionation. More particularly, the process of the present invention may include bleaching the aqueous extract solution with hydrogen peroxide, at a pH between 7 and 11; concentrating the resulting solution using an ultrafiltration process; eliminating salts and low molecular weight components via liquid/liquid extraction of the solution with water using an ultrafiltration process; and recovering the polysaccharide derivative solids using spray-drying, freeze-drying or non-solvent precipitation. Optionally, the bleached solution may be passed through a cation exchange resin to effect the desalination, or additional ultrafiltration steps can be utilized to fractionate the polysaccharide derivatives into more closely defined molecular weight ranges.

Preferably, the decolorization procedure includes treating the aqueous extract solution with hydrogen peroxide ($H_2O_2$) in an amount, by weight, of from 50 to 100% of the lignin content of the aqueous biomass solution, at conditions wherein the solution has a pH of above approximately 7, in the presence of a chelating agent, including, but not limited to, sodium ethylene diamine tetracetate (Na-EDTA), sodium diethylene triamine pentacetic acid ($Na_5DTPA$), but also sodium silicate or other qualified chelating agents, at a temperature of approximately 50° C.

Preferably, before the purification/fractionation step of the present process, the de-colorized solution is cooled and the pH of the solution is reduced using a mineral acid such a hydrochloric acid (HCl). The purification/fractionation procedure preferably includes ultrafiltration of the bleached solution.

Figure 3:
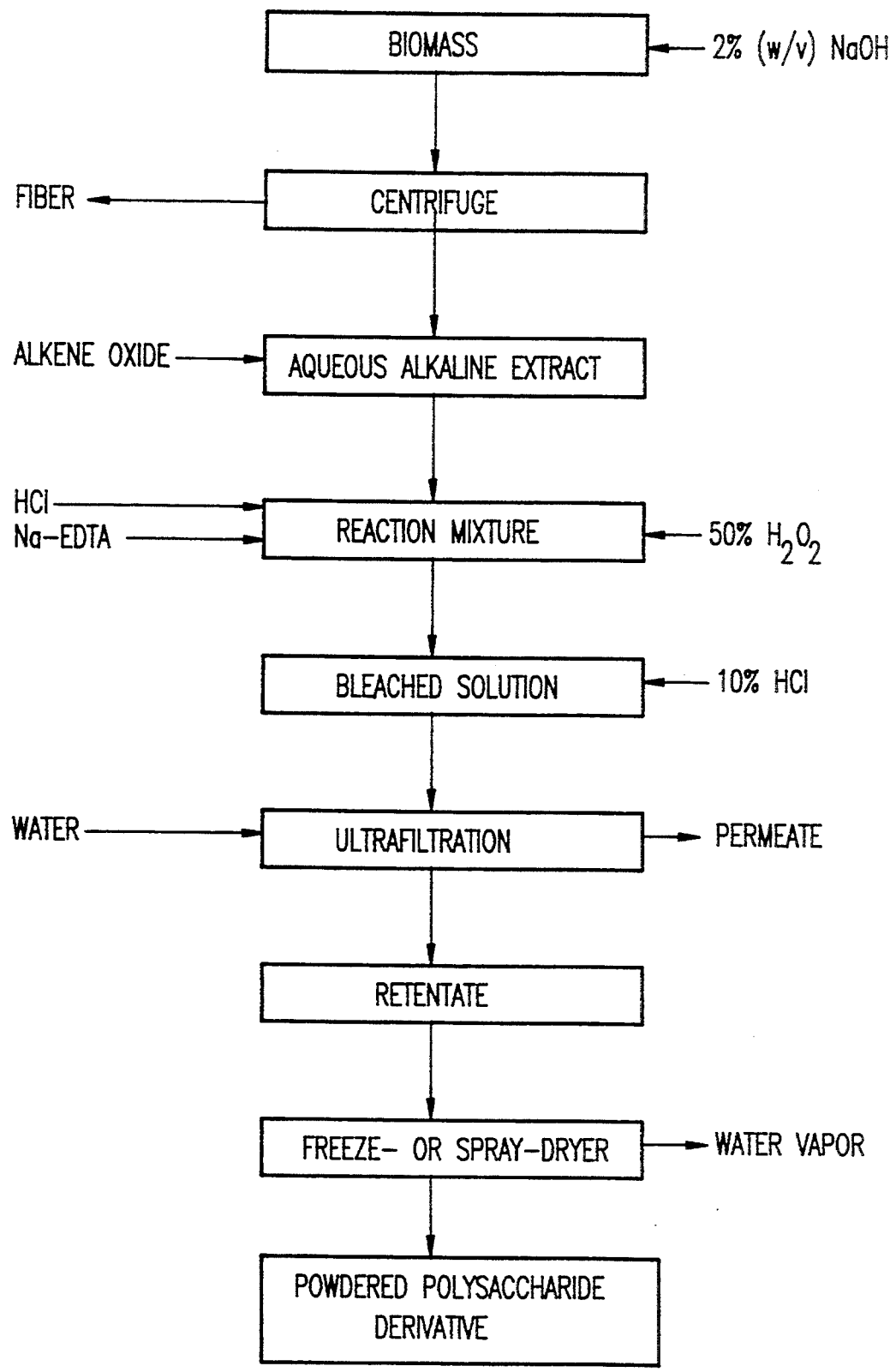
FIG. 3 is a flow diagram of a process for isolating pentosan-rich polysaccharide derivatives from an aqueous extract of biomass according to one embodiment of the present invention.

FIG. 3 shows a possible flow diagram for a process of the present invention starting from the aqueous biomass solution containing the pentosan-rich polysaccharides. Referring to FIG. 3, an alkaline extract (pH 12) from biomass comprising pentosan-rich polysaccharides and other material at a concentration of 8% (weight/volume) is combined with an alkene oxide at a pH 10 to 13.5 and stirred at ambient temperature (20°-25° C.) for 6 to 48 hours. The resulting mixture comprising the pentosan-rich polysaccharide derivatives is treated with HCl to a pH between 7 and 11. Next, Na-EDTA is added in a quantity of 0.1% (weight/volume of total solution) and the solution is allowed to mix thoroughly for one hour.

At this point, ultraviolet spectroscopy may be performed on a sample of the solution to calculate the approximate mass of lignin in the solution. Alternatively, the approximate mass of lignin in the solution may be determined in other manners known to those of ordinary skill in the art.

Next, hydrogen peroxide solution (50% weight/weight) is added in a quantity which depends on the specifications desired in the final xylan derivative. For example hydrogen peroxide solution may be added in a quantity such that the added mass of hydrogen peroxide is equal to the calculated mass of lignin in the aqueous extract solution.

The solution is then slowly heated to 50° C., at which temperature the solution is held isothermally for one hour. The solution is then allowed to cool, at which time the pH is adjusted to a pH between 2 and 7 with HCl. The solution is then concentrated using an ultrafiltration apparatus comprised of 3000, or higher or lower, nominal molecular weight cut-off (NMWCO) membrane cartridges to approximately one-fifth of the original volume. The concentrate is then diafiltered using a volume of fresh water equal to at least three times, but no more than ten times, the volume of concentrate. During the ultrafiltration stages, the temperature of the process solution is maintained at 30° C. with a suitable temperature control device capable of both heating and refrigeration. At the conclusion of diafiltration, the retentate is further concentrated before freeze or spray-drying to yield to the desired pentosan-rich polysaccharide derivative product. Alteratively, the pentosan-rich polysaccharide derivative may be obtained by freeze-drying, non-solvent precipitation, or other suitable techniques.

Figure 4:
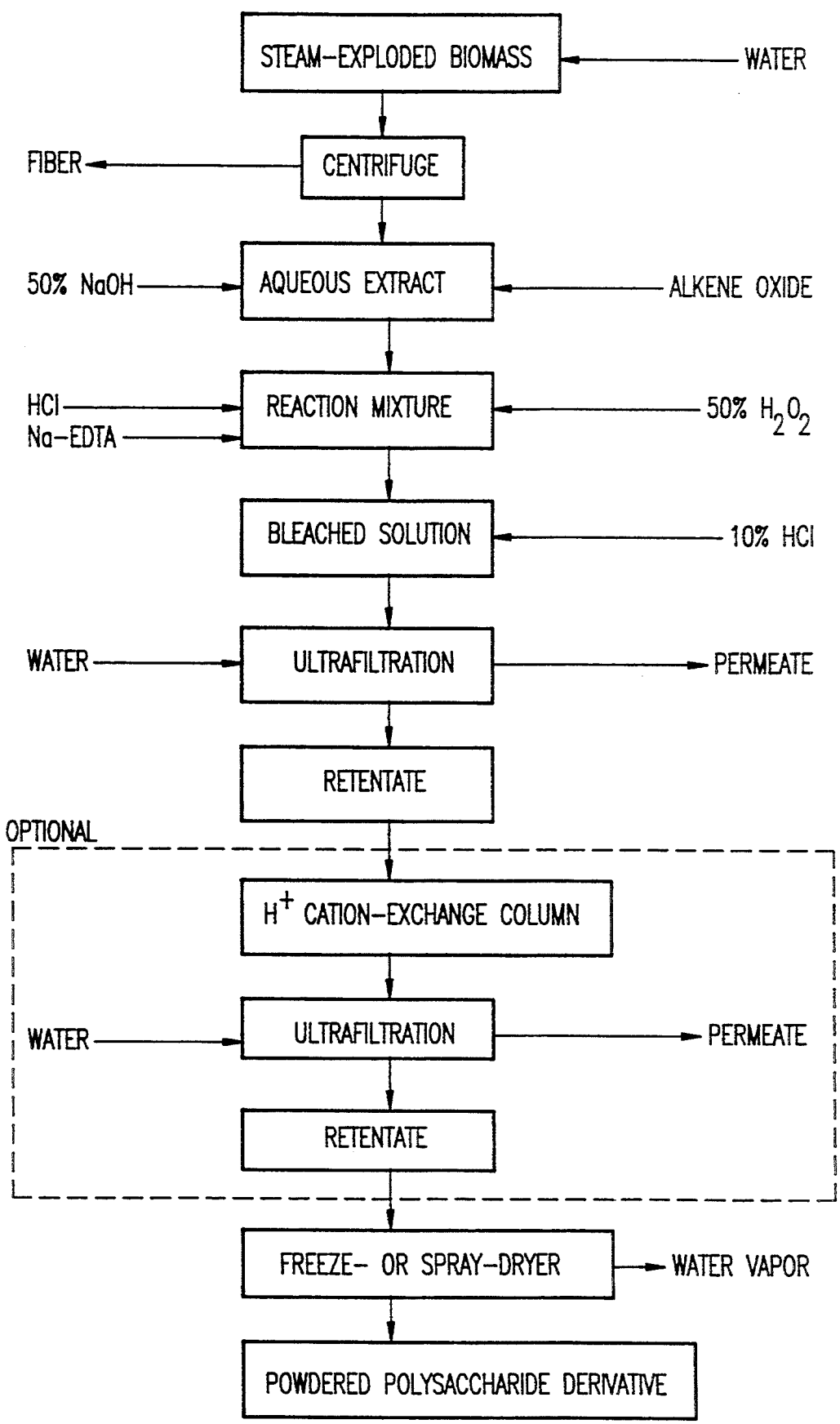
FIG. 4 is a flow diagram of a process for isolating pentosan-rich polysaccharide derivatives from an aqueous extract of biomass according to another embodiment of the present invention.

FIG. 4 shows another possible flow diagram for a process of the present invention, that includes the optional ion-exchange step. Referring to FIG. 4, steam-exploded biomass is extracted with water using a fiber centrifuge or other appropriate devices capable of separating the unsolubilzed biomass from the aqueous extract. The extract is then treated with an alkene oxide at approximately pH 13. After this treatment, the pH of the extract is then adjusted to between 7 and 11 with HCl, and Na-EDTA is added in a quantity of 0.1% (w/v). The mixture is then allowed to stir for one hour. Next, hydrogen peroxide solution (50%, w/w) is added in a quantity such that the added mass of hydrogen peroxide is equal to the calculated mass of lignin in the aqueous extract solution and the reaction mixture is allowed to slowly heat to 50° C. The bleached solution is then allowed to cool before adjusting the pH to between 2 and 7 with 10% HCl solution. The neutralized solution is then concentrated using an ultrafiltration apparatus comprised of 3000, or higher or lower, nominal molecular weight cut-off (NMWCO) membrane cartridges to approximately one-fifth of the original volume. The concentrate is then diafiltered using a volume of fresh water equal to at least three times, but no more than ten times, the volume of concentrate. During the ultrafiltration stages, the temperature of the process solution is maintained at 30° C. with a suitable temperature control device capable of both heating and refrigeration. At the conclusion of diafiltration, the retentate may optionally be passed through an ion-exchange column that is packed with a cation-exchange resin in the hydrogen form, such as Amberlite IR-120 (manufactured and sold by The Dow Chemical Company, Midland, Mich.) in order to assure complete regeneration of the carboxylic acid groups present in the polysaccharide. After the ion-exchange process has been completed, the solution may be returned to the ultrafiltration unit for final diafiltration and concentration. The polysaccharide derivative is then recovered in powder form by using either a freeze or spray dryer.

FIGS. 5 and 6 show the possible flow diagram for a process of the present invention, that includes a preferred process for separating the extractable polysaccharide derivative from the remainder of the biomass. Although a preferred process of the present invention is described using a barley husk starting biomass material, the process may be utilized with other agricultural residues such as peanut hulls, oat spelts, bran, straw and bagasse. Other xylan-rich materials obtainable from (wooden) plants such as sawdust, wood chips, as well as products from the waste stream in the pulp industry may also be utilized. As shown in FIG. 5, in Step 1, a barley husk biomass starting material is first extracted with 0.05N HCl at approximately 70° C. for 2 hours at pH 3.5. The solution is cooled and the pH adjusted to 9.2 with $NH_4OH$ and the solution is stirred overnight.

The next morning the filtrate which consists essentially of starch, pectin, fat, waxes, proteins, etc. is removed and may be acidified to pH 2.0 with an acid to recover the pectin. In Step 2, the biomass residue remaining from the original biomass starting material is extracted with $NaClO_2$/acetic acid at 75° C. for 4 hours at pH 4, or extracted with 1% NaOH in 50–70% ethanol at 75° C. for 2 hours. Alternatively, both extractions are performed in a sequential fashion. The filtrate produced after this alcoholic extraction step may be acidified to pH 2.5 using an appropriate acid to recover lignin.

The biomass residue remaining after Step 2 is next extracted in Step 3 with 4% NaOH at room temperature. The filtrate (A1) is saved for future use. The residue is extracted with 4% NaOH at 70° C. for 2 hours in a nitrogen ($N_2$) atmosphere. The filtrate (A2) is combined with the previously saved filtrate (A1). The residue remaining after the extraction comprises cellulose. This cellulose may be bleached with $H_2O_2$ at pH 12 to produce bleached cellulose.

The combined filtrates (A1+A2) are treated according to the process of the present invention to produce and isolate a pentosan-rich polysaccharide derivative in step 4. As shown by in FIG. 5 the filtrate (A1+A2) is first combined with an alkene oxide at pH 13, and then bleached with $H_2O_2$ at pH 7, in the presence of Na-EDTA according to the process described above. Then in Step 5, the bleached filtrate is subjected to ultrafiltration to separate the component parts on the basis of their molecular weights. This ultrafiltration is performed in the manner described above. After the ultrafiltration step, the remaining retentate is freeze or spray dried to yield a powdered pentosan-rich polysaccharide derivative.

The advantages of the present invention will be further illustrated by the following examples.

EXAMPLE 1

This example illustrates the production of a xylan derivative according to a process of the present invention.

Five kg (kilograms) of barley husk (dry weight) and 50 L (liters) 0.05N hydrochloric acid were added and heated to 70° C. in a Pfaudler reactor for 2 hours. The mixture was cooled to ambient temperature and 300 mL (milliliters) 28–30% ammonium hydroxide solution was added. The mixture was stirred at room temperature for 16 hours. The ammonia extracted fiber was separated by using a fiber centrifuge manufactured and sold by Bock Corporation. The filtrate was acidified to pH 2.0 with 50% hydrochloric acid and the precipitate (mainly polyglucan) was recovered.

Then 40 L water, 430 mL acetic acid and 450 g (grams) sodium chlorite (80% purity) were added to the ammonia extracted fibers and the mixture was heated to 75° C. in a closed Pfaudler reactor for 4 hours. To the mixture, two other portions of 400 g sodium chlorite was added, one after 1 hour and after 2 hours. The mixture was cooled to ambient temperature and lignin free residue was separated using the fiber centrifuge.

The foregoing steps were then repeated to produce a second batch of lignin free residue.

The two batches of 5 kg (initial dry weight) chlorite extracted residue were combined and 50 L 4% sodium hydroxide solution (corrected for moisture in residue) was added. The mixture was then stirred at room temperature for 16 hours. The extracted mixture was centrifuged and the filtrate was collected. The residue was once again extracted with 30 L 4% sodium hydroxide solution (corrected for moisture in residue) at 70° C. for 2 hours. The mixture was cooled and centrifuged. The white cellulose residue was collected (yield 35.9% of the initial dry weight of barley husks) and the filtrate was combined with cold soda extract.

2 L of propylene oxide was added to the combined extract at a pH 13.0 through a funnel in a 200 L closed container and the reaction solution was stirred at ambient temperature for 36 hours. Two other portions of two liters propylene oxide were added, one after 12 hours and, one after 24 hours. The reaction solution was heated to 45° C. for 2 hours and then allowed to cool to ambient temperature.

The pH of the combined extract was adjusted to 7.0 using 50% hydrochloric acid and 120 g sodium ethylenediamine tetracetate (Na-EDTA) and 1000 mL 50% hydrogen peroxide were added. The solution was slowly heated to 45° C. for 2 hours and then allowed to cool over a period of 16 hours. The bleached xylan solution was ultrafiltered using 3000 nominal molecular weight cut-off (NMWCO) spiral cartridges manufactured and sold by Amicon Corporation. During ultrafiltration, the retentate was concentrated to 60 L, then diafiltered with 480 L water and further concentrated to 30 L. The concentrated solution was freeze-dried and about 2800 g of hydroxypropyl xylan powder, a water soluble pentosan-rich polysaccharide (xylan) derivative of the present invention, was obtained.

EXAMPLE 2

This example illustrates the production of a pentosan-rich polysaccharide (xylan) derivative according to another process of the present invention, similar to the process set forth in Example 1.

Five kg (kilograms) of barley husk (dry weight) and 50 L (liters) 0.05N hydrochloric acid were added and heated to 70° C. in a Pfaudler reactor for 2 hours. The mixture was cooled to ambient temperature and 300 mL 28–30% ammonium hydroxide solution was added. The mixture was stirred at room temperature for 16 hours. The extracted fiber was separated by using a fiber centrifuge manufactured and sold by Bock Corporation. The filtrate was acidified to pH 2.0 with 50% hydrochloric acid and the precipitate (mainly polyglucan) was recovered.

Then 50 L, 1% sodium hydroxide in 70% aqueous alcohol was added to the ammonia extracted fibers and the mixture was heated to 75° C. in a closed Pfaudler reactor for 2 hours. The mixture was cooled to ambient temperature and lignin free residue was separated using the fiber centrifuge. The filtrate was acidified to pH 2.0 with 50% hydrochloric acid and the precipitate (lignin) was recovered.

The alcoholic alkali extracted residue and 30 L 4% sodium hydroxide solution (corrected for moisture in residue) were combined. The mixture was then stirred at room temperature for 16 hours. The extracted mixture was centrifuged and the filtrate was collected. The residue was once again extracted with 20 L 4% sodium hydroxide solution (corrected for moisture in residue) at 70° C. for 2 hours. The mixture was cooled and centrifuged. The cellulose residue was collected (yield 38.8% of the initial dry weight of barley husks) and the filtrate was combined with cold soda extract.

One liter of propylene oxide was added to the combined extract at a pH 13.0 through a funnel in a 200 L closed container and the reaction solution was stirred at ambient temperature for 36 hours. Two other portions of one liter propylene oxide were added, one after 12 hours and, one after 24 hours. The reaction solution was heated to 40° C. for 2 hours and then allowed to cool to ambient temperature.

The pH of the combined extract was adjusted to 7.0 using 50% hydrochloric acid and 80 g sodium ethylenediamine tetracetate (Na-EDTA) and 500 mL 50% hydrogen peroxide were added. The solution was slowly heated to 45° C. for 2 hours and then allowed to cool over a period of 16 hours. The bleached xylan solution was ultrafiltered using 3000 nominal molecular weight cut-off (NMWCO) spiral cartridges manufactured and sold by Amicon Corporation. During ultrafiltration, the retentate was concentrated to 40 L, then diafiltered with 360 L water and further concentrated to 20 L. The concentrated solution was freeze-dried and a yield of 25% hydroxypropyl xylan powder, based on the dry weight of staging material (barley husk solids), a water soluble pentosan-rich polysaccharide (xylan) derivative of the present invention, was obtained.

EXAMPLE 3

This example illustrates the production of a pentosan-rich polysaccharide (xylan) derivative according to the process of the present invention from a batch of essentially lignin free xylan residue.

A mixture of 10 g xylan in 40 mL of aqueous sodium hydroxide solution at pH 13 was treated with 20 mL of propylene oxide under stirring at ambient temperature for 24 hours. The resulting reaction mixture was poured into 300 mL acetone, and the precipitated hydroxypropyl xylan was recovered by filtration. This hydroxypropyl xylan (yield approximately 11 g) had a degree of substitution (DS) of 1.9 according to NMR analysis.

EXAMPLE 4

This example also illustrates the production of a pentosan-rich polysaccharide (xylan) derivative according to the process of the present invention from a batch of essentially lignin free xylan residue.

The same procedure as in Example 3 was used except that butylene oxide (20 mL) instead of propylene oxide was employed. Reaction time was 24 hours. The hydroxybutyl xylan (yield, approximately 11.5 g) had a DS of 1.7 according to NMR analysis.

EXAMPLE 5

This example illustrates the production of pentosan-rich polysaccharide derivatives using the process of the present invention at different reaction conditions.

The same procedure as in example 3 was utilized except that a series of reaction mixtures at pH 10.5, 11, 11.5, 12 and 12.5 were substituted for the pH 13 reaction mixture utilized in Example 3. The reaction in each reaction mixture was continued for 24 hours. The conditions were otherwise the same as those of example 3. Each reaction mixture yielded approximately 10–11 g of hydroxypropyl pentosan-rich polysaccharide derivative. The degree of substitution (DS) of each water soluble hydroxypropyl pentosan-rich polysaccharide (xylan) derivative, according to NMR analysis, was as shown in the following table:

| Reaction Mixture pH | Degree of Substitution |
| --- | --- |
| 10.5 | 0.2 |
| 11 | 0.2 |
| 11.5 | 0.3 |
| 12 | 0.4 |
| 12.5 | 0.7 |

These results indicate that a relationship exists between the pH of the reaction mixture and the degree of chemical modification (i.e., substitution) of the polysaccharide derivative.

EXAMPLE 6

This example illustrates the production of a pentosan-rich polysaccharide (xylan) derivative from a batch of essentially lignin free xylan. A mixture of 4 g xylan in 20 mL formamide was treated with 20 mL acetic anhydride at ambient temperature for 24 hours and then the reaction mixture was heated to 80° C. for 1 hr. The resulting reaction mixture was cooled to ambient temperature and poured into 300 mL, 0.5% aqueous hydrochloric acid. The precipitated xylan acetate was recovered by filtration and washing with water. The yield was approximately 5.7 g. The xylan acetate product was insoluble in water and soluble in chloroform, dimethylsulfoxide, tetrahydrofuran and acetone. The product was found to be thermoplastic in nature and flowed when melt-processed with low density polyethylene.

EXAMPLE 7

The same procedure is in Example 6 was used except that propionic anhydride (20 mL) was employed instead of acetic anhydride. The conditions were the same as those of Example 6 except that the precipitate was washed with 4% sodium bicarbonate solution during filtrations. The xylan propionate yield was approximately 6.4 g.

The xylan propionate product was insoluble in water and soluble in chloroform, dimethylsulfoxide, tetrahydrofuran and acetone. The product was found to be thermoplastic in nature and flowed when melt-processed with low density polyethylene.

EXAMPLE 8

The same procedure as in Example 6 was used except that butyric anhydride (25 mL) was employed instead of acetic anhydride. The conditions were otherwise the same as those of Example 6 except that the precipitate was washed with 1% sodium bicarbonate solution during filtration. The xylan butyrate yield was approximately 6.6 g.

The xylan butyrate product was insoluble in water and soluble in chloroform, dimethylsulfoxide, tetrahydrofuran and acetone. The product was found to be thermoplastic in nature and flowed when melt-processed with low density polyethylene.

EXAMPLE 9

The same procedure as in Example 6 was used except that hexanoic anhydride (30 mL) was employed instead of acetic anhydride. The conditions were otherwise the same as those of Example 6, except that the precipitate was washed with 1% sodium bicarbonate solution during filtration. The xylan hexanoate was formed in approximately 8.2 g.

The xylan hexanoate product was insoluble in water and soluble in chloroform, dimethylsulfoxide, tetrahydrofuran and acetone. The product was found to be thermoplastic in nature and flowed when melt-processed with low density polyethylene.

EXAMPLE 10

The same procedure as in Example 6 was used except that hydroxypropyl xylan (DS 0.3) prepared according to example 1 was employed instead of xylan. The acetoxypropyl xylan yield was approximately 4 g.

EXAMPLE 11

The same procedures as in Example 10 was used except that hydroxybutyl xylan (4 g) was employed instead of hydroxypropyl xylan. The acetoxybutyl xylan yield was approximately 4.3 g.

EXAMPLE 12

The same procedure as in Example 6 was used except that hydroxypropyl xylan (4 g) prepared according to Example 2 was employed. The acetoxypropyl xylan yield was approximately 3.8 g.

EXAMPLE 13

A mixture of 4 g hydroxypropyl xylan, prepared according to example 3, in 20 mL formamide was treated with 20 mL acetic anhydride at ambient temperature for 24 hrs before the reaction mixture was heated to 80° C. for 1 hour. The resulting mixture was cooled to ambient temperature and poured into 300 mL 0.5% hydrochloric acid. The precipitated acetoxypropyl xylan was recovered by filtration and washing with water. The yield was approximately 3.8 g.

EXAMPLE 14

The same procedure as in example 13 was utilized except that acetic anhydride was substituted for the propionic anhydride (20 mL). The conditions were otherwise the same as those of example 13, except that the precipitate was washed with 1% sodium bicarbonate solution during filtrations. Approximately 4 g of the propionyloxypropyl xylan was formed.

EXAMPLE 15

This example illustrates the production of a pentosan-rich polysaccharide (xylan) derivative according to the process of the present invention from a batch of essentially lignin free xylan residues.

A mixture of 60 g xylan, 150 g pyridine and 900 mL DMF (dimethylformamide) was heated to 130° C. To this mixture, 350 grams of palmitoyl chloride was gradually added over a time period of 10 minutes, while stirring the reaction mixture. The resulting reaction mixture was refluxed for 3 hours and cooled to 50°–60° C. The reaction product formed a gel-like layer on the top of the reaction mixture. Most of the solvent was decanted from the mixture. The remaining mixture was poured into 70% ethanol and the precipitated xylan palmitate was recovered by filtration and washing with ethanol.

The resulting xylan derivative had a DS of 0.6, according to gas chromatographic analysis, and a melting range of 172°–175° C. The xylan derivative was thermoplastic in nature and flowed when melt processed with low density polyethylene.

EXAMPLE 16

This example illustrates the production of a pentosan-rich polysaccharide (xylan) derivative according to the process of the present invention from a batch of essentially lignin free xylan residue.

18.5 g of NaOH was dissolved in 20 mL of water, filtered and mixed with 180 mL of ethanol. In addition, 28.6 g of chloroacetic acid was dissolved in 125 mL of ethanol.

40 g of xylan was mixed into the chloroacetic acid solution and heated until reflux. The NaOH solution was slowly added to the resulting mixture. The mixture was then refluxed for 15 minutes. The resulting mixture was cooled to ambient temperature, filtered and washed with 85% ethanol.

A yield of approximately 45.3 g of carboxymethyl xylan, with a DS of 0.4 according to NMR analysis, was obtained.

EXAMPLE 17

This example illustrates the production of a pentosan-rich polysaccharide (xylan) derivative according to the process of the present invention from a batch of hydroxypropylated essentially lignin free xylan residue, with a DS of approximately 0.3.

The procedure described in Example 16 was utilized except that hydroxypropyl xylan (DS 0.3 ) was employed as the starting material. The carboxymethyl hydroxypropylxylan yield was approximately 46.0 g.

EXAMPLE 18

This example illustrates the production of a pentosan-rich polysaccharide (xylan) derivative according to the process of the present invention from a batch of essentially lignin free xylan residues.

A mixture of 20.4 g xylan, 60 mL dimethylformamide and pyridine (20 mL) was stirred overnight at ambient temperature. The temperature of the mixture was raise to 90° C., for 1 hour and succinic anhydride was slowly added. The reaction was allowed to proceed in the resulting solution for 6 hours, while the solution was maintained at 85°-90° C. A xylan succinate product was recovered by precipitation in slightly acidic water, filtering, washing with water and then freeze drying.

The yield of the xylan succinate product was approximately 33.5 g. The xylan succinate product was analyzed by hydrolyzing the ester and detecting the amount of succinic acid by high pressure liquid chromatography (HPLC). This analysis showed that the xylan succinate product had a degree of substitution (DS) of 0.8.

EXAMPLE 19

A mixture of 20 g xylan, 50 mL water and 50 g sodium hydroxide was treated with 150 g ethyl chloride and stirred at a temperature between 110° and 115° C. for 8 hours. The resulting mixture was cooled to ambient temperature and poured into 400 mL water. The precipitated ethyl xylan was recovered by filtration and washing with water. The yield was approximately 16 g of ethyl xylan, with a DS of 1.8 according to NMR analysis. The ethyl xylan product was soluble in chloroform, tetrahydrofuran and dimethylsulfoxide. The product was found to be thermoplastic in nature and flowed when melt processed with low density polyethylene.

EXAMPLE 20

The same procedure as in Example 19 was employed except that 100 g of methyl chloride was employed instead of ethyl chloride. The conditions were the same as those of Example 19 except that the reaction mixture was heated at a temperature between 60°-100° C. for 6 hours. The methyl xylan yield was approximately 11 g.

It should be clearly understood that the forms of the present invention herein described are illustrative only and are not intended to limit the scope of the invention.

What is claimed is:

1. A thermoplastic xylan derivative comprising a polysaccharide backbone having an average xylose content of 20-100% by weight substituted at xylose constituents in said polysaccharide backbone with at least one moiety selected from the group consisting of ester moieties and ether moieties and having at least one of the following characteristics:
   an average molecular weight of 1000-200,000 daltons;
   an average degree of polymerization of 10-300;
   an average degree of substitution of 0.2-2.0;
   a polydispersity index of approximately 2-10;
   an average glass transition temperature of 50°-150° C.; and
   solubility in solvent selected from the group consisting of water and an organic solvent.

2. A thermoplastic xylan derivative comprising a polysaccharide backbone having an average xylose content of 20-100% by weight substituted at xylose constituents in said polysaccharide backbone with at least one moiety selected from the group consisting of acetylated ester moieties and acetylated ether moieties and having at least one of the following characteristics:
   an average molecular weight of 1000-200,000 daltons;
   an average degree of polymerization of 10-300;
   an average degree of substitution of 0.2-2.0;
   a polydispersity index of approximately 2-10;
   an average glass transition temperature of 50°-150° C.; and
   solubility in solvent selected from the group consisting of water and an organic solvent.

3. The xylan derivative of claim 1 wherein the ester moiety comprises at least one alkanoyl group having 1 to 24 carbon atoms.

4. The xylan derivative of claim 2 wherein the ester moiety comprises at least one alkanoyl group having 1 to 24 carbon atoms.

5. The xylan derivative of claim 3 wherein the alkanoyl group has 1 to 20 carbon atoms.

6. The xylan derivative of claim 4 wherein the alkanoyl group has 1 to 20 carbon atoms.

7. The xylan derivative of claim 3 wherein the alkanoyl group is selected from the group consisting of acetyl, propionyl, hexanoyl, octanoyl, decanoyl, lauroyl, myristyl, palmityl, succinyl, phthalyl, and fumaroyl.

8. The xylan derivative of claim 4 wherein the alkanoyl group is selected from the group consisting of acetyl, propionyl, hexanoyl, octanoyl, decanoyl, lauroyl, myristyl, palmityl, succinyl, phthalyl, and fumaroyl.

9. The xylan derivative of claim 1 wherein the ether moiety comprises an alkyl group having 1 to 6 carbon atoms.

10. The xylan derivative of claim 2 wherein the ether moiety comprises an alkyl group having 1 to 6 carbon atoms.

11. The xylan derivative of claim 9 wherein the alkyl group is selected from the group consisting of methyl, ethyl, propyl, butyl, and isopropyl.

12. The xylan derivative of claim 10 wherein the alkyl group is selected from the group consisting of methyl, ethyl, propyl, butyl, and isopropyl.

13. The xylan derivative of claim 1 wherein the ester moiety comprises at least two different alkanoyl groups having 1 to 24 carbon atoms.

14. The xylan derivative of claim 2 wherein the ester moiety comprises at least two different alkanoyl groups having 1 to 24 carbon atoms.

* * * * *